(12) United States Patent
Middleton et al.

(10) Patent No.: US 8,230,272 B2
(45) Date of Patent: Jul. 24, 2012

(54) METHODS AND SYSTEMS FOR DETECTION OF ANOMALIES IN DIGITAL DATA STREAMS

(75) Inventors: Nicholas L. Middleton, Cartersville, GA (US); Bryan G. Donaldson, Cummings, GA (US)

(73) Assignee: Intelliscience Corporation, Atlanta, GA (US)

( * ) Notice: Subject to any disclaimer, the term of this patent is extended or adjusted under 35 U.S.C. 154(b) by 235 days.

(21) Appl. No.: 12/693,319

(22) Filed: Jan. 25, 2010

(65) Prior Publication Data

US 2010/0192024 A1   Jul. 29, 2010

Related U.S. Application Data

(60) Provisional application No. 61/147,016, filed on Jan. 23, 2009.

(51) Int. Cl.
*G06F 11/00* (2006.01)

(52) U.S. Cl. .......................................... 714/704; 714/39
(58) Field of Classification Search .................. None
See application file for complete search history.

(56) References Cited

U.S. PATENT DOCUMENTS

| 2007/0244844 | A1  | 10/2007 | Brinson et al. |
| 2009/0271664 | A1* | 10/2009 | Haas et al. ........................ 714/48 |
| 2010/0071061 | A1* | 3/2010  | Crovella et al. ................. 726/23 |

* cited by examiner

*Primary Examiner* — Guerrier Merant
(74) *Attorney, Agent, or Firm* — Lowe Graham Jones PLLC

(57) ABSTRACT

Systems and methods for determining whether or not one or pluralities of events, patterns, or data elements present within a given digital data stream should be delimited as anomalous. The system requires analyzes the data elements of the data stream using any acceptable user-specified, preset, or automatically determined analysis system. The results of the data processing, which are stored in a data storage structure such as a synaptic web or a data array for example, reveal synaptic paths (patterns) of characteristic algorithm values that function to individually define or delimit the selected data element(s) from the remainder of the original data stream.

20 Claims, 27 Drawing Sheets

|   | 1 | 2 | 3 | 4 | 5 | 6 | 7 | 8 | 9 | 10 |
|---|---|---|---|---|---|---|---|---|---|---|
| 1 | 128 | 128 | 128 | 128 | 128 | 128 | 128 | 128 | 128 | 128 |
| 2 | 128 | 128 | 128 | 128 | 128 | 255 | 128 | 128 | 128 | 128 |
| 3 | 128 | 128 | 128 | 128 | 128 | 255 | 255 | 128 | 128 | 128 |
| 4 | 128 | 128 | 128 | 128 | 128 | 255 | 128 | 128 | 128 | 128 |
| 5 | 128 | 128 | 128 | 255 | 255 | 255 | 255 | 255 | 128 | 128 |
| 6 | 0 | 0 | 0 | 0 | 255 | 255 | 255 | 0 | 0 | 0 |
| 7 | 0 | 0 | 0 | 0 | 0 | 0 | 0 | 0 | 0 | 0 |
| 8 | 0 | 0 | 0 | 0 | 0 | 0 | 0 | 0 | 0 | 0 |
| 9 | 0 | 0 | 0 | 0 | 0 | 0 | 0 | 0 | 0 | 0 |
| 10 | 0 | 0 | 0 | 0 | 0 | 0 | 0 | 0 | 0 | 0 |

FIG. 6

| 1 | 2 | 3 |
|---|---|---|
| 4 | 5 | 6 |
| 7 | 8 | 9 |

FIG. 7

| TDE location reference | ALG1 | ALG2 | ALG3 | TDE location reference | ALG1 | ALG2 | ALG3 |
| --- | --- | --- | --- | --- | --- | --- | --- |
| (2, 2) | 128 | 0 | 1 | (2, 6) | 43 | 128 | 2 |
| (3, 2) | 128 | 0 | 1 | (3, 6) | 57 | 255 | 3 |
| (4, 2) | 128 | 0 | 1 | (4, 6) | 99 | 255 | 3 |
| (5, 2) | 156 | 127 | 2 | (5, 6) | 142 | 255 | 2 |
| (6, 2) | 170 | 127 | 2 | (6, 6) | 170 | 255 | 2 |
| (7, 2) | 170 | 127 | 2 | (7, 6) | 142 | 255 | 2 |
| (8, 2) | 142 | 127 | 2 | (8, 6) | 99 | 255 | 3 |
| (9, 2) | 128 | 0 | 1 | (9, 6) | 57 | 255 | 3 |
| (2, 3) | 128 | 0 | 1 | (2, 7) | 0 | 0 | 1 |
| (3, 3) | 128 | 0 | 1 | (3, 7) | 0 | 0 | 1 |
| (4, 3) | 128 | 0 | 1 | (4, 7) | 28 | 255 | 2 |
| (5, 3) | 170 | 127 | 2 | (5, 7) | 57 | 255 | 2 |
| (6, 3) | 184 | 127 | 2 | (6, 7) | 85 | 255 | 2 |
| (7, 3) | 184 | 127 | 2 | (7, 7) | 57 | 255 | 2 |
| (8, 3) | 142 | 127 | 2 | (8, 7) | 28 | 255 | 2 |
| (9, 3) | 128 | 0 | 1 | (9, 7) | 0 | 0 | 1 |
| (2, 4) | 128 | 0 | 1 | (2, 8) | 0 | 0 | 1 |
| (3, 4) | 142 | 127 | 2 | (3, 8) | 0 | 0 | 1 |
| (4, 4) | 156 | 127 | 2 | (4, 8) | 0 | 0 | 1 |
| (5, 4) | 199 | 127 | 2 | (5, 8) | 0 | 0 | 1 |
| (6, 4) | 213 | 127 | 2 | (6, 8) | 0 | 0 | 1 |
| (7, 4) | 213 | 127 | 2 | (7, 8) | 0 | 0 | 1 |
| (8, 4) | 170 | 127 | 2 | (8, 8) | 0 | 0 | 1 |
| (9, 4) | 142 | 127 | 2 | (9, 8) | 0 | 0 | 1 |
| (2, 5) | 85 | 128 | 2 | (2, 9) | 0 | 0 | 1 |
| (3, 5) | 99 | 255 | 3 | (3, 9) | 0 | 0 | 1 |
| (4, 5) | 142 | 255 | 3 | (4, 9) | 0 | 0 | 1 |
| (5, 5) | 198 | 255 | 3 | (5, 9) | 0 | 0 | 1 |
| (6, 5) | 227 | 127 | 2 | (6, 9) | 0 | 0 | 1 |
| (7, 5) | 198 | 255 | 3 | (7, 9) | 0 | 0 | 1 |
| (8, 5) | 142 | 255 | 3 | (8, 9) | 0 | 0 | 1 |
| (9, 5) | 99 | 255 | 3 | (9, 9) | 0 | 0 | 1 |

FIG. 8

| TDE location reference | Pattern | TDE location reference | Pattern |
|---|---|---|---|
| (2, 2) | 128,0,1 | (2, 6) | 43,128,2 |
| (3, 2) | 128,0,1 | (3, 6) | 57,255,3 |
| (4, 2) | 128,0,1 | (4, 6) | 99,255,3 |
| (5, 2) | 156,127,2 | (5, 6) | 142,255,2 |
| (6, 2) | 170,127,2 | (6, 6) | 170,255,2 |
| (7, 2) | 170,127,2 | (7, 6) | 142,255,2 |
| (8, 2) | 142,127,2 | (8, 6) | 99,255,3 |
| (9, 2) | 128,0,1 | (9, 6) | 57,255,3 |
| (2, 3) | 128,0,1 | (2, 7) | 0,0,1 |
| (3, 3) | 128,0,1 | (3, 7) | 0,0,1 |
| (4, 3) | 128,0,1 | (4, 7) | 28,255,2 |
| (5, 3) | 170,127,2 | (5, 7) | 57,255,2 |
| (6, 3) | 184,127,2 | (6, 7) | 85,255,2 |
| (7, 3) | 184,127,2 | (7, 7) | 57,255,2 |
| (8, 3) | 142,127,2 | (8, 7) | 28,255,2 |
| (9, 3) | 128,0,1 | (9, 7) | 0,0,1 |
| (2, 4) | 128,0,1 | (2, 8) | 0,0,1 |
| (3, 4) | 142,127,2 | (3, 8) | 0,0,1 |
| (4, 4) | 156,127,2 | (4, 8) | 0,0,1 |
| (5, 4) | 199,127,2 | (5, 8) | 0,0,1 |
| (6, 4) | 213,127,2 | (6, 8) | 0,0,1 |
| (7, 4) | 213,127,2 | (7, 8) | 0,0,1 |
| (8, 4) | 170,127,2 | (8, 8) | 0,0,1 |
| (9, 4) | 142,127,2 | (9, 8) | 0,0,1 |
| (2, 5) | 85,128,2 | (2, 9) | 0,0,1 |
| (3, 5) | 99,255,3 | (3, 9) | 0,0,1 |
| (4, 5) | 142,255,3 | (4, 9) | 0,0,1 |
| (5, 5) | 198,255,3 | (5, 9) | 0,0,1 |
| (6, 5) | 227,127,2 | (6, 9) | 0,0,1 |
| (7, 5) | 198,255,3 | (7, 9) | 0,0,1 |
| (8, 5) | 142,255,3 | (8, 9) | 0,0,1 |
| (9, 5) | 99,255,3 | (9, 9) | 0,0,1 |

FIG. 9

| Pattern | Occurrence count |
|---|---|
| 0,0,1 | 19 |
| 128,0,1 | 9 |
| 142,127,2 | 4 |
| 170,127,2 | 4 |
| 99,255,3 | 4 |
| 142,255,2 | 2 |
| 142,255,3 | 2 |
| 156,127,2 | 2 |
| 184,127,2 | 2 |
| 198,255,3 | 2 |
| 213,127,2 | 2 |
| 28,255,2 | 2 |
| 57,255,2 | 2 |
| 57,255,3 | 2 |
| 170,255,2 | 1 |
| 199,127,2 | 1 |
| 227,127,2 | 1 |
| 43,128,2 | 1 |
| 85,128,2 | 1 |
| 85,255,2 | 1 |

FIG. 10

|   | 1 | 2 | 3 | 4 | 5 | 6 | 7 | 8 | 9 | 10 |
|---|---|---|---|---|---|---|---|---|---|---|
| 1 |   |   |   |   |   |   |   |   |   |   |
| 2 |   | 128,0,1 | 128,0,1 | 128,0,1 | 156,127,2 | 170,127,2 | 170,127,2 | 142,127,2 | 128,0,1 |   |
| 3 |   | 128,0,1 | 128,0,1 | 128,0,1 | 170,127,2 | 184,127,2 | 184,127,2 | 142,127,2 | 128,0,1 |   |
| 4 |   | 128,0,1 | 142,127,2 | 156,127,2 | 199,127,2 | 213,127,2 | 213,127,2 | 170,127,2 | 142,127,2 |   |
| 5 |   | 85,128,2 | 99,255,3 | 142,255,3 | 198,255,3 | 227,127,2 | 198,255,3 | 142,255,3 | 99,255,3 |   |
| 6 |   | 43,128,2 | 57,255,3 | 99,255,3 | 142,255,2 | 170,255,2 | 142,255,2 | 99,255,3 | 57,255,3 |   |
| 7 |   | 0,0,1 | 0,0,1 | 28,255,2 | 57,255,2 | 85,255,2 | 57,255,2 | 28,255,2 | 0,0,1 |   |
| 8 |   | 0,0,1 | 0,0,1 | 0,0,1 | 0,0,1 | 0,0,1 | 0,0,1 | 0,0,1 | 0,0,1 |   |
| 9 |   | 0,0,1 | 0,0,1 | 0,0,1 | 0,0,1 | 0,0,1 | 0,0,1 | 0,0,1 | 0,0,1 |   |
| 10 |   |   |   |   |   |   |   |   |   |   |

FIG. 11

|   | 1 | 2 | 3 | 4 | 5 | 6 | 7 | 8 | 9 | 10 |
|---|---|---|---|---|---|---|---|---|---|----|
| 1 | 128 | 128 | 128 | 128 | 128 | 128 | 128 | 128 | 128 | 128 |
| 2 | 128 | 128 | 128 | 128 | 128 | 128 | 128 | 128 | 128 | 128 |
| 3 | 128 | 128 | 128 | 128 | 128 | 128 | 128 | 128 | 128 | 128 |
| 4 | 128 | 128 | 128 | 128 | 128 | 128 | 128 | 128 | 128 | 128 |
| 5 | 128 | 128 | 128 | 128 | 128 | 128 | 128 | 128 | 128 | 128 |
| 6 | 128 | 128 | 128 | 128 | 128 | 128 | 128 | 128 | 128 | 128 |
| 7 | 0 | 128 | 0 | 128 | 0 | 128 | 0 | 128 | 0 | 128 |
| 8 | 0 | 0 | 0 | 0 | 0 | 0 | 0 | 0 | 0 | 0 |
| 9 | 0 | 0 | 0 | 0 | 0 | 0 | 0 | 0 | 0 | 0 |
| 10 | 0 | 0 | 0 | 0 | 0 | 0 | 0 | 0 | 0 | 0 |

FIG. 12

| TDE location reference | ALG1 | ALG2 | ALG3 | Pattern | TDE location reference | ALG1 | ALG2 | ALG3 | Pattern |
|---|---|---|---|---|---|---|---|---|---|
| (2, 2) | 128 | 0 | 1 | 128,0,1 | (2, 6) | 100 | 128 | 2 | 100,128,2 |
| (3, 2) | 128 | 0 | 1 | 128,0,1 | (3, 6) | 114 | 128 | 2 | 114,128,2 |
| (4, 2) | 128 | 0 | 1 | 128,0,1 | (4, 6) | 100 | 128 | 2 | 100,128,2 |
| (5, 2) | 128 | 0 | 1 | 128,0,1 | (5, 6) | 114 | 128 | 2 | 114,128,2 |
| (6, 2) | 128 | 0 | 1 | 128,0,1 | (6, 6) | 100 | 128 | 2 | 100,128,2 |
| (7, 2) | 128 | 0 | 1 | 128,0,1 | (7, 6) | 114 | 128 | 2 | 114,128,2 |
| (8, 2) | 128 | 0 | 1 | 128,0,1 | (8, 6) | 100 | 128 | 2 | 100,128,2 |
| (9, 2) | 128 | 0 | 1 | 128,0,1 | (9, 6) | 114 | 128 | 2 | 114,128,2 |
| (2, 3) | 128 | 0 | 1 | 128,0,1 | (2, 7) | 57 | 128 | 2 | 57,128,2 |
| (3, 3) | 128 | 0 | 1 | 128,0,1 | (3, 7) | 71 | 128 | 2 | 71,128,2 |
| (4, 3) | 128 | 0 | 1 | 128,0,1 | (4, 7) | 57 | 128 | 2 | 57,128,2 |
| (5, 3) | 128 | 0 | 1 | 128,0,1 | (5, 7) | 71 | 128 | 2 | 71,128,2 |
| (6, 3) | 128 | 0 | 1 | 128,0,1 | (6, 7) | 57 | 128 | 2 | 57,128,2 |
| (7, 3) | 128 | 0 | 1 | 128,0,1 | (7, 7) | 71 | 128 | 2 | 71,128,2 |
| (8, 3) | 128 | 0 | 1 | 128,0,1 | (8, 7) | 57 | 128 | 2 | 57,128,2 |
| (9, 3) | 128 | 0 | 1 | 128,0,1 | (9, 7) | 71 | 128 | 2 | 71,128,2 |
| (2, 4) | 128 | 0 | 1 | 128,0,1 | (2, 8) | 14 | 128 | 2 | 14,128,2 |
| (3, 4) | 128 | 0 | 1 | 128,0,1 | (3, 8) | 28 | 128 | 2 | 28,128,2 |
| (4, 4) | 128 | 0 | 1 | 128,0,1 | (4, 8) | 14 | 128 | 2 | 14,128,2 |
| (5, 4) | 128 | 0 | 1 | 128,0,1 | (5, 8) | 28 | 128 | 2 | 28,128,2 |
| (6, 4) | 128 | 0 | 1 | 128,0,1 | (6, 8) | 14 | 128 | 2 | 14,128,2 |
| (7, 4) | 128 | 0 | 1 | 128,0,1 | (7, 8) | 28 | 128 | 2 | 28,128,2 |
| (8, 4) | 128 | 0 | 1 | 128,0,1 | (8, 8) | 14 | 128 | 2 | 14,128,2 |
| (9, 4) | 128 | 0 | 1 | 128,0,1 | (9, 8) | 28 | 128 | 2 | 28,128,2 |
| (2, 5) | 128 | 0 | 1 | 128,0,1 | (2, 9) | 0 | 0 | 1 | 0,0,1 |
| (3, 5) | 128 | 0 | 1 | 128,0,1 | (3, 9) | 0 | 0 | 1 | 0,0,1 |
| (4, 5) | 128 | 0 | 1 | 128,0,1 | (4, 9) | 0 | 0 | 1 | 0,0,1 |
| (5, 5) | 128 | 0 | 1 | 128,0,1 | (5, 9) | 0 | 0 | 1 | 0,0,1 |
| (6, 5) | 128 | 0 | 1 | 128,0,1 | (6, 9) | 0 | 0 | 1 | 0,0,1 |
| (7, 5) | 128 | 0 | 1 | 128,0,1 | (7, 9) | 0 | 0 | 1 | 0,0,1 |
| (8, 5) | 128 | 0 | 1 | 128,0,1 | (8, 9) | 0 | 0 | 1 | 0,0,1 |
| (9, 5) | 128 | 0 | 1 | 128,0,1 | (9, 9) | 0 | 0 | 1 | 0,0,1 |

FIG. 13

| Pattern | Occurrence count |
|---|---|
| 0,0,1 | 8 |
| 128,0,1 | 32 |
| 100,128,2 | 4 |
| 114,128,2 | 4 |
| 57,128,2 | 4 |
| 71,128,2 | 4 |
| 14,128,2 | 4 |
| 28,128,2 | 4 |

FIG. 14

|   | 1 | 2 | 3 | 4 | 5 | 6 | 7 | 8 | 9 | 10 |
|---|---|---|---|---|---|---|---|---|---|---|
| 1 |   |   |   |   |   |   |   |   |   |   |
| 2 |   | 128,0,1 | 128,0,1 | 128,0,1 | 128,0,1 | 128,0,1 | 128,0,1 | 128,0,1 | 128,0,1 |   |
| 3 |   | 128,0,1 | 128,0,1 | 128,0,1 | 128,0,1 | 128,0,1 | 128,0,1 | 128,0,1 | 128,0,1 |   |
| 4 |   | 128,0,1 | 128,0,1 | 128,0,1 | 128,0,1 | 128,0,1 | 128,0,1 | 128,0,1 | 128,0,1 |   |
| 5 |   | 128,0,1 | 128,0,1 | 128,0,1 | 128,0,1 | 128,0,1 | 128,0,1 | 128,0,1 | 128,0,1 |   |
| 6 |   | 100,128,2 | 114,128,2 | 100,128,2 | 114,128,2 | 100,128,2 | 114,128,2 | 100,128,2 | 114,128,2 |   |
| 7 |   | 57,128,2 | 71,128,2 | 57,128,2 | 71,128,2 | 57,128,2 | 71,128,2 | 57,128,2 | 71,128,2 |   |
| 8 |   | 14,128,2 | 28,128,2 | 14,128,2 | 28,128,2 | 14,128,2 | 28,128,2 | 14,128,2 | 28,128,2 |   |
| 9 |   | 0,0,1 | 0,0,1 | 0,0,1 | 0,0,1 | 0,0,1 | 0,0,1 | 0,0,1 | 0,0,1 |   |
| 10 |   |   |   |   |   |   |   |   |   |   |

FIG. 15

|   | 1 | 2 | 3 | 4 | 5 | 6 | 7 | 8 | 9 | 10 |
|---|---|---|---|---|---|---|---|---|---|----|
| 1 | 128 | 128 | 128 | 128 | 128 | 128 | 128 | 128 | 128 | 128 |
| 2 | 128 | 128 | 128 | 128 | 128 | 128 | 128 | 128 | 128 | 128 |
| 3 | 128 | 128 | 128 | 128 | 128 | 128 | 128 | 128 | 128 | 128 |
| 4 | 128 | 128 | 128 | 128 | 128 | 128 | 128 | 128 | 128 | 128 |
| 5 | 128 | 0 | 128 | 0 | 128 | 0 | 128 | 0 | 128 | 0 |
| 6 | 0 | 0 | 0 | 0 | 0 | 0 | 0 | 0 | 0 | 0 |
| 7 | 0 | 0 | 0 | 0 | 0 | 0 | 0 | 0 | 0 | 0 |
| 8 | 0 | 0 | 0 | 0 | 0 | 0 | 0 | 0 | 0 | 0 |
| 9 | 0 | 0 | 0 | 0 | 0 | 0 | 0 | 0 | 0 | 0 |
| 10 | 0 | 0 | 0 | 0 | 0 | 0 | 0 | 0 | 0 | 0 |

FIG. 16

| TDE location reference | ALG1 | ALG2 | ALG3 | Pattern | TDE location reference | ALG1 | ALG2 | ALG3 | Pattern |
|---|---|---|---|---|---|---|---|---|---|
| (2, 2) | 128 | 0 | 1 | 128,0,1 | (2, 6) | 28 | 128 | 2 | 28,128,2 |
| (3, 2) | 128 | 0 | 1 | 128,0,1 | (3, 6) | 14 | 128 | 2 | 14,128,2 |
| (4, 2) | 128 | 0 | 1 | 128,0,1 | (4, 6) | 28 | 128 | 2 | 28,128,2 |
| (5, 2) | 128 | 0 | 1 | 128,0,1 | (5, 6) | 14 | 128 | 2 | 14,128,2 |
| (6, 2) | 128 | 0 | 1 | 128,0,1 | (6, 6) | 28 | 128 | 2 | 28,128,2 |
| (7, 2) | 128 | 0 | 1 | 128,0,1 | (7, 6) | 14 | 128 | 2 | 14,128,2 |
| (8, 2) | 128 | 0 | 1 | 128,0,1 | (8, 6) | 28 | 128 | 2 | 28,128,2 |
| (9, 2) | 128 | 0 | 1 | 128,0,1 | (9, 6) | 14 | 128 | 2 | 14,128,2 |
| (2, 3) | 128 | 0 | 1 | 128,0,1 | (2, 7) | 0 | 0 | 1 | 0,0,1 |
| (3, 3) | 128 | 0 | 1 | 128,0,1 | (3, 7) | 0 | 0 | 1 | 0,0,1 |
| (4, 3) | 128 | 0 | 1 | 128,0,1 | (4, 7) | 0 | 0 | 1 | 0,0,1 |
| (5, 3) | 128 | 0 | 1 | 128,0,1 | (5, 7) | 0 | 0 | 1 | 0,0,1 |
| (6, 3) | 128 | 0 | 1 | 128,0,1 | (6, 7) | 0 | 0 | 1 | 0,0,1 |
| (7, 3) | 128 | 0 | 1 | 128,0,1 | (7, 7) | 0 | 0 | 1 | 0,0,1 |
| (8, 3) | 128 | 0 | 1 | 128,0,1 | (8, 7) | 0 | 0 | 1 | 0,0,1 |
| (9, 3) | 128 | 0 | 1 | 128,0,1 | (9, 7) | 0 | 0 | 1 | 0,0,1 |
| (2, 4) | 114 | 128 | 2 | 114,128,2 | (2, 8) | 0 | 0 | 1 | 0,0,1 |
| (3, 4) | 100 | 128 | 2 | 100,128,2 | (3, 8) | 0 | 0 | 1 | 0,0,1 |
| (4, 4) | 114 | 128 | 2 | 114,128,2 | (4, 8) | 0 | 0 | 1 | 0,0,1 |
| (5, 4) | 100 | 128 | 2 | 100,128,2 | (5, 8) | 0 | 0 | 1 | 0,0,1 |
| (6, 4) | 114 | 128 | 2 | 114,128,2 | (6, 8) | 0 | 0 | 1 | 0,0,1 |
| (7, 4) | 100 | 128 | 2 | 100,128,2 | (7, 8) | 0 | 0 | 1 | 0,0,1 |
| (8, 4) | 114 | 128 | 2 | 114,128,2 | (8, 8) | 0 | 0 | 1 | 0,0,1 |
| (9, 4) | 100 | 128 | 2 | 100,128,2 | (9, 8) | 0 | 0 | 1 | 0,0,1 |
| (2, 5) | 71 | 128 | 2 | 71,128,2 | (2, 9) | 0 | 0 | 1 | 0,0,1 |
| (3, 5) | 57 | 128 | 2 | 57,128,2 | (3, 9) | 0 | 0 | 1 | 0,0,1 |
| (4, 5) | 71 | 128 | 2 | 71,128,2 | (4, 9) | 0 | 0 | 1 | 0,0,1 |
| (5, 5) | 57 | 128 | 2 | 57,128,2 | (5, 9) | 0 | 0 | 1 | 0,0,1 |
| (6, 5) | 71 | 128 | 2 | 71,128,2 | (6, 9) | 0 | 0 | 1 | 0,0,1 |
| (7, 5) | 57 | 128 | 2 | 57,128,2 | (7, 9) | 0 | 0 | 1 | 0,0,1 |
| (8, 5) | 71 | 128 | 2 | 71,128,2 | (8, 9) | 0 | 0 | 1 | 0,0,1 |
| (9, 5) | 57 | 128 | 2 | 57,128,2 | (9, 9) | 0 | 0 | 1 | 0,0,1 |

FIG. 17

| Pattern | Occurrence count | Prior occurrence count | Total occurrence count |
|---|---|---|---|
| 0,0,1 | 24 | 8 | 32 |
| 128,0,1 | 16 | 32 | 48 |
| 100,128,2 | 4 | 4 | 8 |
| 114,128,2 | 4 | 4 | 8 |
| 57,128,2 | 4 | 4 | 8 |
| 71,128,2 | 4 | 4 | 8 |
| 14,128,2 | 4 | 4 | 8 |
| 28,128,2 | 4 | 4 | 8 |

FIG. 18

| | 1 | 2 | 3 | 4 | 5 | 6 | 7 | 8 | 9 | 10 |
|---|---|---|---|---|---|---|---|---|---|---|
| 1 | | | | | | | | | | |
| 2 | | 128,0,1 | 128,0,1 | 128,0,1 | 128,0,1 | 128,0,1 | 128,0,1 | 128,0,1 | 128,0,1 | |
| 3 | | 128,0,1 | 128,0,1 | 128,0,1 | 128,0,1 | 128,0,1 | 128,0,1 | 128,0,1 | 128,0,1 | |
| 4 | | 114,128,2 | 100,128,2 | 114,128,2 | 100,128,2 | 114,128,2 | 100,128,2 | 114,128,2 | 100,128,2 | |
| 5 | | 71,128,2 | 57,128,2 | 71,128,2 | 57,128,2 | 71,128,2 | 57,128,2 | 71,128,2 | 57,128,2 | |
| 6 | | 28,128,2 | 14,128,2 | 28,128,2 | 14,128,2 | 28,128,2 | 14,128,2 | 28,128,2 | 14,128,2 | |
| 7 | | 0,0,1 | 0,0,1 | 0,0,1 | 0,0,1 | 0,0,1 | 0,0,1 | 0,0,1 | 0,0,1 | |
| 8 | | 0,0,1 | 0,0,1 | 0,0,1 | 0,0,1 | 0,0,1 | 0,0,1 | 0,0,1 | 0,0,1 | |
| 9 | | 0,0,1 | 0,0,1 | 0,0,1 | 0,0,1 | 0,0,1 | 0,0,1 | 0,0,1 | 0,0,1 | |
| 10 | | | | | | | | | | |

FIG. 19

|    | 1   | 2   | 3   | 4   | 5   | 6   | 7   | 8   | 9   | 10  |
|----|-----|-----|-----|-----|-----|-----|-----|-----|-----|-----|
| 1  | 128 | 128 | 128 | 128 | 128 | 128 | 128 | 128 | 128 | 128 |
| 2  | 128 | 128 | 128 | 128 | 128 | 128 | 128 | 128 | 128 | 128 |
| 3  | 0   | 128 | 0   | 128 | 0   | 128 | 0   | 128 | 0   | 128 |
| 4  | 0   | 0   | 0   | 0   | 0   | 0   | 0   | 0   | 0   | 0   |
| 5  | 0   | 0   | 0   | 0   | 0   | 0   | 0   | 0   | 0   | 0   |
| 6  | 0   | 0   | 0   | 0   | 0   | 0   | 0   | 0   | 0   | 0   |
| 7  | 0   | 0   | 0   | 0   | 0   | 0   | 0   | 0   | 0   | 0   |
| 8  | 0   | 0   | 0   | 0   | 0   | 0   | 0   | 0   | 0   | 0   |
| 9  | 0   | 0   | 0   | 0   | 0   | 0   | 0   | 0   | 0   | 0   |
| 10 | 0   | 0   | 0   | 0   | 0   | 0   | 0   | 0   | 0   | 0   |

FIG. 20

| TDE location reference | ALG1 | ALG2 | ALG3 | Pattern | TDE location reference | ALG1 | ALG2 | ALG3 | Pattern |
|---|---|---|---|---|---|---|---|---|---|
| (2, 2) | 100 | 128 | 2 | 100,128,2 | (2, 6) | 0 | 0 | 1 | 0,0,1 |
| (3, 2) | 114 | 128 | 2 | 114,128,2 | (3, 6) | 0 | 0 | 1 | 0,0,1 |
| (4, 2) | 100 | 128 | 2 | 100,128,2 | (4, 6) | 0 | 0 | 1 | 0,0,1 |
| (5, 2) | 114 | 128 | 2 | 114,128,2 | (5, 6) | 0 | 0 | 1 | 0,0,1 |
| (6, 2) | 100 | 128 | 2 | 100,128,2 | (6, 6) | 0 | 0 | 1 | 0,0,1 |
| (7, 2) | 114 | 128 | 2 | 114,128,2 | (7, 6) | 0 | 0 | 1 | 0,0,1 |
| (8, 2) | 100 | 128 | 2 | 100,128,2 | (8, 6) | 0 | 0 | 1 | 0,0,1 |
| (9, 2) | 114 | 128 | 2 | 114,128,2 | (9, 6) | 0 | 0 | 1 | 0,0,1 |
| (2, 3) | 57 | 128 | 2 | 57,128,2 | (2, 7) | 0 | 0 | 1 | 0,0,1 |
| (3, 3) | 71 | 128 | 2 | 71,128,2 | (3, 7) | 0 | 0 | 1 | 0,0,1 |
| (4, 3) | 57 | 128 | 2 | 57,128,2 | (4, 7) | 0 | 0 | 1 | 0,0,1 |
| (5, 3) | 71 | 128 | 2 | 71,128,2 | (5, 7) | 0 | 0 | 1 | 0,0,1 |
| (6, 3) | 57 | 128 | 2 | 57,128,2 | (6, 7) | 0 | 0 | 1 | 0,0,1 |
| (7, 3) | 71 | 128 | 2 | 71,128,2 | (7, 7) | 0 | 0 | 1 | 0,0,1 |
| (8, 3) | 57 | 128 | 2 | 57,128,2 | (8, 7) | 0 | 0 | 1 | 0,0,1 |
| (9, 3) | 71 | 128 | 2 | 71,128,2 | (9, 7) | 0 | 0 | 1 | 0,0,1 |
| (2, 4) | 14 | 128 | 2 | 14,128,2 | (2, 8) | 0 | 0 | 1 | 0,0,1 |
| (3, 4) | 28 | 128 | 2 | 28,128,2 | (3, 8) | 0 | 0 | 1 | 0,0,1 |
| (4, 4) | 14 | 128 | 2 | 14,128,2 | (4, 8) | 0 | 0 | 1 | 0,0,1 |
| (5, 4) | 28 | 128 | 2 | 28,128,2 | (5, 8) | 0 | 0 | 1 | 0,0,1 |
| (6, 4) | 14 | 128 | 2 | 14,128,2 | (6, 8) | 0 | 0 | 1 | 0,0,1 |
| (7, 4) | 28 | 128 | 2 | 28,128,2 | (7, 8) | 0 | 0 | 1 | 0,0,1 |
| (8, 4) | 14 | 128 | 2 | 14,128,2 | (8, 8) | 0 | 0 | 1 | 0,0,1 |
| (9, 4) | 28 | 128 | 2 | 28,128,2 | (9, 8) | 0 | 0 | 1 | 0,0,1 |
| (2, 5) | 0 | 0 | 1 | 0,0,1 | (2, 9) | 0 | 0 | 1 | 0,0,1 |
| (3, 5) | 0 | 0 | 1 | 0,0,1 | (3, 9) | 0 | 0 | 1 | 0,0,1 |
| (4, 5) | 0 | 0 | 1 | 0,0,1 | (4, 9) | 0 | 0 | 1 | 0,0,1 |
| (5, 5) | 0 | 0 | 1 | 0,0,1 | (5, 9) | 0 | 0 | 1 | 0,0,1 |
| (6, 5) | 0 | 0 | 1 | 0,0,1 | (6, 9) | 0 | 0 | 1 | 0,0,1 |
| (7, 5) | 0 | 0 | 1 | 0,0,1 | (7, 9) | 0 | 0 | 1 | 0,0,1 |
| (8, 5) | 0 | 0 | 1 | 0,0,1 | (8, 9) | 0 | 0 | 1 | 0,0,1 |
| (9, 5) | 0 | 0 | 1 | 0,0,1 | (9, 9) | 0 | 0 | 1 | 0,0,1 |

FIG. 21

| Pattern | Occurrence count | Prior occurrence count | Sum occurrence count |
|---|---|---|---|
| 0,0,1 | 40 | 32 | 72 |
| 128,0,1 | 0 | 48 | 48 |
| 100,128,2 | 4 | 8 | 12 |
| 114,128,2 | 4 | 8 | 12 |
| 57,128,2 | 4 | 8 | 12 |
| 71,128,2 | 4 | 8 | 12 |
| 14,128,2 | 4 | 8 | 12 |
| 28,128,2 | 4 | 8 | 12 |

FIG. 22

|   | 1 | 2 | 3 | 4 | 5 | 6 | 7 | 8 | 9 | 10 |
|---|---|---|---|---|---|---|---|---|---|---|
| 1 |   |   |   |   |   |   |   |   |   |   |
| 2 |   | 100,128,2 | 114,128,2 | 100,128,2 | 114,128,2 | 100,128,2 | 114,128,2 | 100,128,2 | 114,128,2 |   |
| 3 |   | 57,128,2 | 71,128,2 | 57,128,2 | 71,128,2 | 57,128,2 | 71,128,2 | 57,128,2 | 71,128,2 |   |
| 4 |   | 14,128,2 | 28,128,2 | 14,128,2 | 28,128,2 | 14,128,2 | 28,128,2 | 14,128,2 | 28,128,2 |   |
| 5 |   | 0,0,1 | 0,0,1 | 0,0,1 | 0,0,1 | 0,0,1 | 0,0,1 | 0,0,1 | 0,0,1 |   |
| 6 |   | 0,0,1 | 0,0,1 | 0,0,1 | 0,0,1 | 0,0,1 | 0,0,1 | 0,0,1 | 0,0,1 |   |
| 7 |   | 0,0,1 | 0,0,1 | 0,0,1 | 0,0,1 | 0,0,1 | 0,0,1 | 0,0,1 | 0,0,1 |   |
| 8 |   | 0,0,1 | 0,0,1 | 0,0,1 | 0,0,1 | 0,0,1 | 0,0,1 | 0,0,1 | 0,0,1 |   |
| 9 |   | 0,0,1 | 0,0,1 | 0,0,1 | 0,0,1 | 0,0,1 | 0,0,1 | 0,0,1 | 0,0,1 |   |
| 10 |   |   |   |   |   |   |   |   |   |   |

FIG. 23

|   | 1 | 2 | 3 | 4 | 5 | 6 | 7 | 8 | 9 | 10 |
|---|---|---|---|---|---|---|---|---|---|----|
| 1 | 128 | 128 | 128 | 128 | 128 | 128 | 128 | 128 | 128 | 128 |
| 2 | 128 | 128 | 128 | 128 | 128 | 255 | 128 | 128 | 128 | 128 |
| 3 | 128 | 128 | 128 | 128 | 128 | 255 | 255 | 128 | 128 | 128 |
| 4 | 128 | 128 | 128 | 128 | 128 | 255 | 128 | 128 | 128 | 128 |
| 5 | 128 | 128 | 128 | 128 | 255 | 255 | 255 | 128 | 128 | 128 |
| 6 | 0 | 0 | 0 | 0 | 0 | 255 | 0 | 0 | 0 | 0 |
| 7 | 0 | 0 | 0 | 0 | 0 | 0 | 0 | 0 | 0 | 0 |
| 8 | 0 | 0 | 0 | 0 | 0 | 0 | 0 | 0 | 0 | 0 |
| 9 | 0 | 0 | 0 | 0 | 0 | 0 | 0 | 0 | 0 | 0 |
| 10 | 0 | 0 | 0 | 0 | 0 | 0 | 0 | 0 | 0 | 0 |

FIG. 24

| TDE location reference | ALG1 | ALG2 | ALG3 | Pattern | TDE location reference | ALG1 | ALG2 | ALG3 | Pattern |
| --- | --- | --- | --- | --- | --- | --- | --- | --- | --- |
| (2, 2) | 128 | 0 | 1 | 128,0,1 | (2, 6) | 43 | 128 | 2 | 43,128,2 |
| (3, 2) | 128 | 0 | 1 | 128,0,1 | (3, 6) | 43 | 128 | 2 | 43,128,2 |
| (4, 2) | 128 | 0 | 1 | 128,0,1 | (4, 6) | 57 | 255 | 3 | 57,255,3 |
| (5, 2) | 156 | 127 | 2 | 156,127,2 | (5, 6) | 99 | 255 | 3 | 99,255,3 |
| (6, 2) | 170 | 127 | 2 | 170,127,2 | (6, 6) | 113 | 255 | 2 | 113,255,2 |
| (7, 2) | 170 | 127 | 2 | 170,127,2 | (7, 6) | 99 | 255 | 3 | 99,255,3 |
| (8, 2) | 142 | 127 | 2 | 142,127,2 | (8, 6) | 57 | 255 | 3 | 57,255,3 |
| (9, 2) | 128 | 0 | 1 | 128,0,1 | (9, 6) | 43 | 128 | 2 | 43,128,2 |
| (2, 3) | 128 | 0 | 1 | 128,0,1 | (2, 7) | 0 | 0 | 1 | 0,0,1 |
| (3, 3) | 128 | 0 | 1 | 128,0,1 | (3, 7) | 0 | 0 | 1 | 0,0,1 |
| (4, 3) | 128 | 0 | 1 | 128,0,1 | (4, 7) | 0 | 0 | 1 | 0,0,1 |
| (5, 3) | 170 | 127 | 2 | 170,127,2 | (5, 7) | 28 | 255 | 2 | 28,255,2 |
| (6, 3) | 184 | 127 | 2 | 184,127,2 | (6, 7) | 28 | 255 | 2 | 28,255,2 |
| (7, 3) | 184 | 127 | 2 | 184,127,2 | (7, 7) | 28 | 255 | 2 | 28,255,2 |
| (8, 3) | 142 | 127 | 2 | 142,127,2 | (8, 7) | 0 | 0 | 1 | 0,0,1 |
| (9, 3) | 128 | 0 | 1 | 128,0,1 | (9, 7) | 0 | 0 | 1 | 0,0,1 |
| (2, 4) | 128 | 0 | 1 | 128,0,1 | (2, 8) | 0 | 0 | 1 | 0,0,1 |
| (3, 4) | 128 | 0 | 1 | 128,0,1 | (3, 8) | 0 | 0 | 1 | 0,0,1 |
| (4, 4) | 142 | 127 | 2 | 142,127,2 | (4, 8) | 0 | 0 | 1 | 0,0,1 |
| (5, 4) | 184 | 127 | 2 | 184,127,2 | (5, 8) | 0 | 0 | 1 | 0,0,1 |
| (6, 4) | 213 | 127 | 2 | 213,127,2 | (6, 8) | 0 | 0 | 1 | 0,0,1 |
| (7, 4) | 199 | 127 | 2 | 199,127,2 | (7, 8) | 0 | 0 | 1 | 0,0,1 |
| (8, 4) | 156 | 127 | 2 | 156,127,2 | (8, 8) | 0 | 0 | 1 | 0,0,1 |
| (9, 4) | 128 | 0 | 1 | 128,0,1 | (9, 8) | 0 | 0 | 1 | 0,0,1 |
| (2, 5) | 85 | 128 | 2 | 85,128,2 | (2, 9) | 0 | 0 | 1 | 0,0,1 |
| (3, 5) | 85 | 128 | 2 | 85,128,2 | (3, 9) | 0 | 0 | 1 | 0,0,1 |
| (4, 5) | 99 | 255 | 3 | 99,255,3 | (4, 9) | 0 | 0 | 1 | 0,0,1 |
| (5, 5) | 156 | 255 | 3 | 156,255,3 | (5, 9) | 0 | 0 | 1 | 0,0,1 |
| (6, 5) | 170 | 255 | 3 | 170,255,3 | (6, 9) | 0 | 0 | 1 | 0,0,1 |
| (7, 5) | 156 | 255 | 3 | 156,255,3 | (7, 9) | 0 | 0 | 1 | 0,0,1 |
| (8, 5) | 99 | 255 | 3 | 99,255,3 | (8, 9) | 0 | 0 | 1 | 0,0,1 |
| (9, 5) | 85 | 128 | 2 | 85,128,2 | (9, 9) | 0 | 0 | 1 | 0,0,1 |

FIG. 25

| Pattern | Occurrence count | Prior occurrence count | Sum occurrence count |
|---|---|---|---|
| 0,0,1 | 21 | 72 | 93 |
| 128,0,1 | 11 | 48 | 59 |
| 142,127,2 | 3 | 0 | 3 |
| 170,127,2 | 3 | 0 | 3 |
| 99,255,3 | 4 | 0 | 4 |
| 156,127,2 | 2 | 0 | 2 |
| 184,127,2 | 3 | 0 | 3 |
| 113,255,2 | 1 | 0 | 1 |
| 213,127,2 | 1 | 0 | 1 |
| 28,255,2 | 3 | 0 | 3 |
| 57,255,3 | 2 | 0 | 2 |
| 156,255,3 | 2 | 0 | 2 |
| 199,127,2 | 1 | 0 | 1 |
| 170,255,3 | 1 | 0 | 1 |
| 43,128,2 | 3 | 0 | 3 |
| 85,128,2 | 3 | 0 | 3 |
| 100,128,2 | 0 | 12 | 12 |
| 114,128,2 | 0 | 12 | 12 |
| 57,128,2 | 0 | 12 | 12 |
| 71,128,2 | 0 | 12 | 12 |
| 14,128,2 | 0 | 12 | 12 |
| 28,128,2 | 0 | 12 | 12 |

FIG. 26

|   | 1 | 2 | 3 | 4 | 5 | 6 | 7 | 8 | 9 | 10 |
|---|---|---|---|---|---|---|---|---|---|---|
| 1 |   |   |   |   |   |   |   |   |   |   |
| 2 |   | 128,0,1 | 128,0,1 | 128,0,1 | 156,127,2 | 170,127,2 | 170,127,2 | 142,127,2 | 128,0,1 |   |
| 3 |   | 128,0,1 | 128,0,1 | 128,0,1 | 170,127,2 | 184,127,2 | 184,127,2 | 142,127,2 | 128,0,1 |   |
| 4 |   | 128,0,1 | 128,0,1 | 142,127,2 | 184,127,2 | 213,127,2 | 199,127,2 | 156,127,2 | 128,0,1 |   |
| 5 |   | 85,128,2 | 85,128,2 | 99,255,3 | 156,255,3 | 170,255,3 | 156,255,3 | 99,255,3 | 85,128,2 |   |
| 6 |   | 43,128,2 | 43,128,2 | 57,255,3 | 99,255,3 | 113,255,2 | 99,255,3 | 57,255,3 | 43,128,2 |   |
| 7 |   | 0,0,1 | 0,0,1 | 0,0,1 | 28,255,2 | 28,255,2 | 28,255,2 | 0,0,1 | 0,0,1 |   |
| 8 |   | 0,0,1 | 0,0,1 | 0,0,1 | 0,0,1 | 0,0,1 | 0,0,1 | 0,0,1 | 0,0,1 |   |
| 9 |   | 0,0,1 | 0,0,1 | 0,0,1 | 0,0,1 | 0,0,1 | 0,0,1 | 0,0,1 | 0,0,1 |   |
| 10 |   |   |   |   |   |   |   |   |   |   |

FIG. 27

METHODS AND SYSTEMS FOR DETECTION OF ANOMALIES IN DIGITAL DATA STREAMS

PRIORITY

This application claims the benefit of U.S. Provisional Application Ser. No. 61/147,016 filed Jan. 23, 2009; contents of which are incorporated herein.

FIELD OF THE INVENTION

The present invention, in various embodiments, relates generally to the field of data analysis and more particularly to detection of anomalies present within digital data using pattern-based analyses and mathematical improbability.

BACKGROUND OF THE INVENTION

An anomaly, also referred to as an outlier, deviation, exception, intrusion, contamination, or the like, is most aptly defined as an event, pattern, point, or data element that does not conform to expectations or what those versed in the given art consider to be "normal" behavior. Most traditionally, an anomaly occurs infrequently when compared to other normal events in a given data stream or pattern. Since anomalies are in most cases rare by definition, their identification becomes exceedingly important in fields where detection of the abnormal or uncommon is paramount. Some examples include, inter alia, healthcare and medicine where an atypical lesion detected during a standard magnetic resonance image might indicate a more serious disease such as cancer; homeland security and border control where an aberrant vessel nearing the coastline might suggest illegal activity; finance and investment where unusual transaction behavior could signify fraud in some form; and computer and network security where seemingly harmless network traffic changes might actually indicate the presence of a worm or other intruder.

As various and numerous enhancements to modern-day security, surveillance, and other monitoring systems inundate analysts of varying research fields with immense volumes of highly dimensional data, the obvious need to automatically and intelligently detect the presence of anomalous events, all the while reducing the occurrences of false positive identifications, is only exacerbated. Where once manual human inspection was preferred, the science has grown to include, inter alia, graphical approaches such as box, scatter, and spin plots depending upon data dimensionality; statistical approaches such as parametric modeling for describing data distribution and delineating between majority and anomalous data; distance based approaches such as nearest neighbor and clustering techniques whereby outliers are defined based upon their "fit" in the neighborhood of surrounding data elements; and model based approaches such as data element classification whereby "normal" and/or "abnormal" exemplars are used as models to differentiate data elements of a given data stream. Nonetheless, each of the aforementioned techniques are marred by inherent complications, including high occurrences of false positive identifications as previously unseen but legitimate data elements are marked anomalous; difficulties in estimating data distributions due to dimensionality issues; computational inefficiencies; data confusion when the original data stream is plagued by noise; necessitation of registration between and among data streams when attempting to analyze data elements relative to those of a neighborhood; etc.

SUMMARY OF THE INVENTION

In a preferred embodiment, the system of the present invention provides a means by which to determine whether or not one or pluralities of events, patterns, or data elements present within a given digital data stream should be delimited as anomalous. Prior to anomaly detection and in one embodiment, the system requires that the data elements of the data stream be analyzed using any acceptable user-specified, preset, or automatically determined analysis system, such as disclosed in U.S. patent application 2007/0244844 by Brinson, et al. The results of said data processing, which are stored in a data storage structure such as a synaptic web (as described by Brinson, et al.) or a data array for example, reveal synaptic paths (hereafter "patterns") of characteristic algorithm values that function to individually define or delimit the selected data element(s) from the remainder of the original data stream.

Once the characteristics of the selected data elements are obtained, the system of the present invention analyzes the patterns to determine those that are uncommon. In a preferred example of the present invention, the system for anomaly detection assumes that those data elements that are uncommon or improbable in a "normal" data stream should be earmarked as anomalous.

In one embodiment, anomalous data elements in a given data stream are determined by calculating the average number of times any given characteristic pattern is identified (i.e., calculate a hit or occurrence count) in the data and subsequently requiring that this occurrence count exceed some threshold value or not exceed some limit value of occurrence counts in order for it to be marked as anomalous. In an alternate embodiment, "normal" exemplars, as sourced from an original data stream and analyzed using user-specified, preset, or automatically determined evaluation algorithms and a target data area (TDA), are obtained, characterized, and stored. New data streams are then obtained, analyzed using the same evaluation algorithms and TDA, and compared to this a priori knowledge; if the resultant pattern is not stored, then the selected data element(s) is considered anomalous.

In an alternate embodiment, the system stores and "learns" the data patterns associated with each test data stream that is analyzed and adds these data patterns to a datastore of "prior" knowledge. In this way, the data patterns that are considered "normal" are constantly and consistently re-evaluated and updated so as to ensure that only truly anomalous events, patterns, or data elements are delimited as such.

In other aspects of the present invention, the system provides an automated functionality that operates on the full resolution of the native data. The results are produced in a timely manner thereby alleviating the tedium of preliminary human analysis and can function to alert the operator to examine a given data stream(s) requiring attention.

BRIEF DESCRIPTION OF THE DRAWINGS

The preferred and alternative embodiments of the present invention are described in detail below with reference to the following drawings.

FIG. 6 shows an example ten-data element by ten-data element data array of a grey-scale image selection of a white boat on black water with grey sky;

FIG. 7 shows the adjacent-data element TDA;

FIG. 8 shows one embodiment of a data storage structure for storing the results of algorithmic processing of the FIG. 6 data array;

FIG. 9 shows an example data table representing Pattern Element Storage and containing the data value patterns associated with each valid TDE of the FIG. 6 data array;

FIG. 10 shows an example data table representing Pattern Analysis Storage and containing all unique patterns and their associated occurrence counts found after algorithmic processing of the FIG. 6 data array;

FIG. 11 shows an example data array representing one embodiment of an output representation of the anomalous data elements found after algorithmic processing of the FIG. 6 data array;

FIG. 12 shows an example ten-data element by ten-data element data array of a grey-scale image selection of a low horizon with black water below and grey sky above;

FIG. 13 shows one embodiment of a data storage structure for storing the results of algorithmic processing of the FIG. 12 data array. The last column of data in the data table represents Pattern Element Storage and contains the data value patterns associated with each valid TDE of the FIG. 12 data array;

FIG. 14 shows an example data table representing Pattern Analysis Storage and containing all unique patterns and their associated occurrence counts found after algorithmic processing of the FIG. 12 data array;

FIG. 15 shows an example data array representing one embodiment of an output representation of the anomalous data elements found after algorithmic processing of the FIG. 12 data array; in this instance, no anomalous data elements exist;

FIG. 16 shows an example ten-data element by ten-data element data array of a grey-scale image selection of a medium horizon with black water below and grey sky above;

FIG. 17 shows one embodiment of a data storage structure for storing the results of algorithmic processing of the FIG. 16 data array. The last column of data in the data table represents Pattern Element Storage and contains the data value patterns associated with each valid TDE of the FIG. 16 data array;

FIG. 18 shows an example data table representing Pattern Analysis Storage and containing all unique patterns and their associated occurrence counts found after algorithmic processing of the FIG. 16 data array;

FIG. 19 shows an example data array representing one embodiment of an output representation of the anomalous data elements found after algorithmic processing of the FIG. 16 data array; in this instance, no anomalous data elements exist;

FIG. 20 shows an example ten-data element by ten-data element data array of a grey-scale image selection of a high horizon with black water below and grey sky above;

FIG. 21 shows one embodiment of a data storage structure for storing the results of algorithmic processing of the FIG. 20 data array. The last column of data in the data table represents Pattern Element Storage and contains the data value patterns associated with each valid TDE of the FIG. 20 data array;

FIG. 22 shows an example data table representing Pattern Analysis Storage and containing all unique patterns and their associated occurrence counts found after algorithmic processing of the FIG. 20 data array;

FIG. 23 shows an example data array representing one embodiment of an output representation of the anomalous data elements found after algorithmic processing of the FIG. 20 data array; in this instance, no anomalous data elements exist;

FIG. 24 shows an example ten-data element by ten-data element data array of a grey-scale image selection of a white boat on black water with grey sky;

FIG. 25 shows one embodiment of a data storage structure for storing the results of algorithmic processing of the FIG. 24 data array. The last column of data in the data table represents Pattern Element Storage and contains the data value patterns associated with each valid TDE of the FIG. 24 data array;

FIG. 26 shows an example data table representing Pattern Analysis Storage and containing all unique patterns and their associated occurrence counts found after algorithmic processing of the FIG. 24 data array; and FIG. 27 shows an example data array representing one embodiment of an output representation of the anomalous data elements found after algorithmic processing of the FIG. 24 data array; in this instance, four anomalous data elements exist.

DETAILED DESCRIPTION OF THE PREFERRED EMBODIMENT

Figure 1:
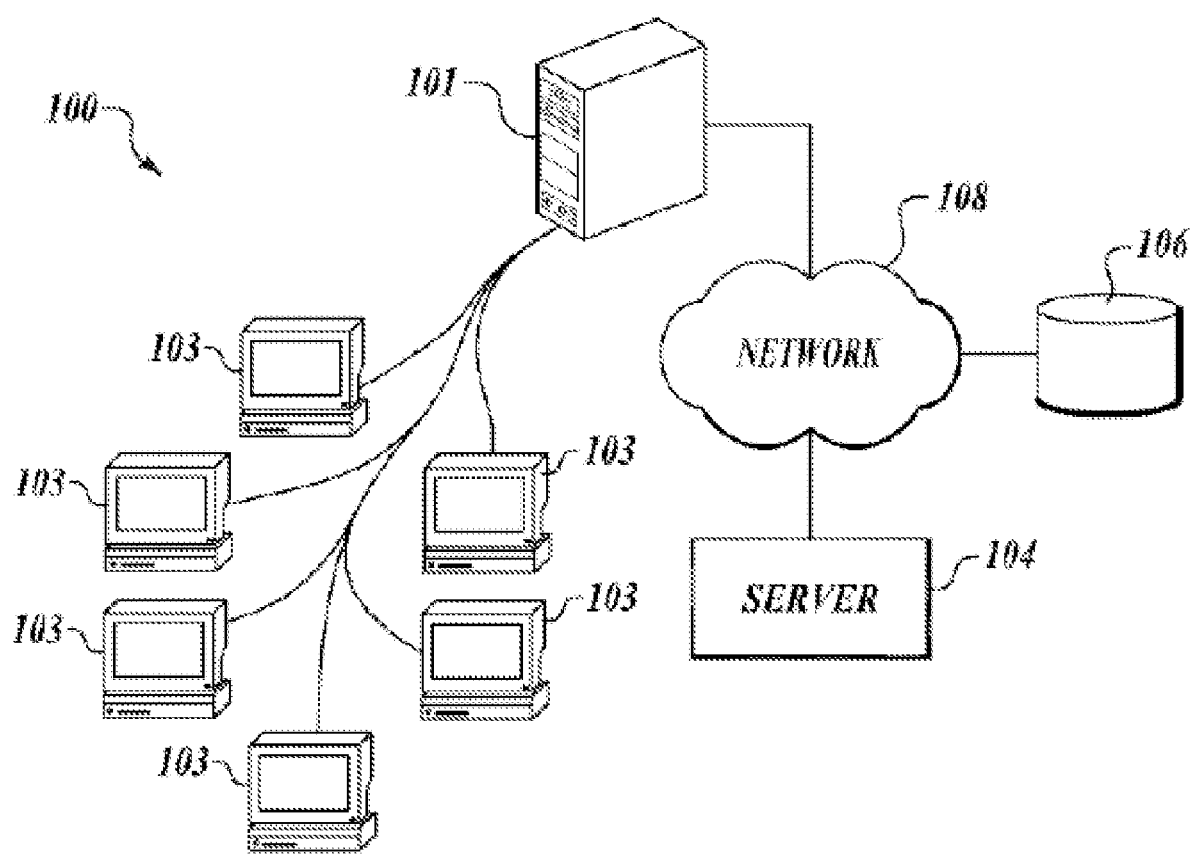
FIG. 1 shows one embodiment of an example system employed for anomaly detection in digital data.

The methods and systems of the anomaly detection system embodiments and examples as described herein can be used to identify anomalous events, patterns, and/or data elements in one or pluralities of digital data streams.

The embodiments of an anomaly detection system described herein generally involve the analysis of digital data streams for the purpose of learning and repeatedly recognizing anomalous events, patterns, and/or data elements within the data. The digital data streams can be conversions of an analog source to digital format. In some embodiments, the data organization structure used by the system involves a web (referred to in U.S. patent application 2007/0244844 by Brinson, et al., as a "synaptic web") of interconnected data fields used to describe the elements of a defined object or feature.

In a preferred embodiment, said methods and systems presuppose that data elements of a given data stream that are uncommon or statistically improbable in a user-specified, preset, or automatically determined "normal" data stream should be defined as anomalous. The process used to determine which events, patterns, or data elements are anomalous begins with analysis of said events, patterns, or data elements using any user-specified, preset, automatically determined, and/or industry or system acceptable data analysis technique(s) or methodology(ies), such as in one embodiment the data analysis and feature recognition system as exemplified in U.S. patent application 2007/0244844 by Brinson, et al.

As disclosed in the aforementioned patent application of Brinson, et al., a synaptic path (i.e., characteristic pattern or vector) is developed for each selected data element in the data stream by analyzing the given data element, as well as its relationships with and to surrounding data elements, using one or pluralities of user-specified, preset, and/or automatically determined evaluation algorithms and one or pluralities of target data areas (hereafter "TDAs"). These patterns are subsequently stored in a data storage structure, referred to therein as a synaptic web, in order to allow further evaluation, such as determination of the "uncommon" or anomalous patterns, to be performed later.

In one embodiment, these uncommon patterns are identified via a process that calculates the mean of the number of times any given pattern is identified in the data stream (also referred to as calculation of a "mean occurrence count") and subsequently utilizes some fractional portion or percentage of this value as a basis for a threshold (i.e., sensitivity) value. Any pattern with an occurrence count less than the threshold value is delimited as anomalous. In an alternate embodiment, it is possible to use other statistical methods, such as the calculation of a percentage of the median occurrence count or standard deviations of the distribution of occurrence values, for determining this threshold value. In an alternate embodiment, the anomalous patterns are determined by an occurrence count in one of a number of previously determined ranges, which might be necessary if the process should ignore unique patterns and only react to patterns with more than a single occurrence. This embodiment lends itself to usefulness when performing prior analysis to determine the probabilities of a given pattern in a selected section of a particular data stream.

In an alternate embodiment, the methods and systems for anomaly detection in data streams begins with a priori knowledge of what is considered "normal" for a given scene or segment within the data stream. In this case, exemplar samples are obtained and analyzed using the method as disclosed in U.S. patent application 2007/0244844 by Brinson, et al., or by any other acceptable data analysis system. When a new data stream is to be evaluated for anomalies, the data stream is analyzed using the exact same methodology as was used for establishing the exemplar(s). In this way, if the pattern for a given data element in the new data stream is found to be uncommon or unknown, as determined through comparison with the exemplar, then that data element is considered to be anomalous.

In yet another embodiment, the system of the present invention can learn and acclimate over time to any "anomalous" data patterns that appear a user-specified, preset, or automatically determined number of times. Once this threshold of occurrence counts is reached, for example, or after continued analysis of the same test data streams, the stored patterns can update to discriminate the once "anomalous" data elements as commonplace. In this way, the incidence of false positive identifications of anomalies is reduced.

Although several of the anomaly detection system embodiments and examples as discussed herein are described with reference to specific data types, modalities, submodalities, etc., such as imagery data sets, the present invention is not limited in scope or breadth to analysis of these data types. The methods and systems as described herein can be used to analyze any data set or other collection of information that can be represented in a quantifiable datastore.

As used herein, the term "datastore" retains its traditional meaning and refers to any software or hardware element capable of at least temporarily storing data.

As used herein, the term "target data element" (TDE) refers to a discrete portion of a larger data set in a given data stream or medium that is being evaluated for characteristics using evaluation algorithms and a given TDA. A TDE can be any size appropriate for a particular data type, modality, submodality, etc. For example, in a set of graphical data, a TDE can consist of a single pixel, a localized grouping of pixels, or any other discrete grouping of pixels. In several embodiments and regardless of size, a TDE is a "point" that is evaluated in a single discrete step before processing moves to the next valid TDE in the data set or selection therein.

As used herein, the term "target data area" (TDA) refers to an ordered collection of data elements immediately surrounding a TDE. The size and shape of the TDA vary depending upon the type of data or medium that is evaluated, user specifications, and/or industry- or system-acceptable standards and can define the member-data elements available for inclusion during evaluation of a given TDE.

As used herein, the term "synaptic web," which is also embodied herein as an algorithm datastore or other user-specified, preset, or automatically determined storage structure such as a data table, refers to an organizational structure for storing information about discrete features, patterns, objects, or other known data sets in an implementation such as a rooted, fixed depth tree, a binary tree, or some other user-specified, preset, and/or automatically determined structure. A synaptic web advantageously allows the information about the known features to be quickly added and an unknown data set to be quickly evaluated in order to identify any known features contained therein.

As used herein, the term "synaptic path," which is also embodied herein as a pattern, refers to pluralities of data values resulting from processing the TDE(s) with the predetermined evaluation algorithms. The synaptic path is derived based upon algorithmic calculations for TDEs.

As used herein, the term "algorithm" retains its traditional meaning and refers without limitation to any series of repeatable steps resulting in a discrete "value." For example, an algorithm can include any mathematical calculation. In several embodiments, various algorithms are performed on a TDE in relation to a previously defined TDA in order to produce a single, meaningful value.

As used herein, the term "(data) modality" retains its traditional meaning and refers to one of the various different forms or formats of digital data that can be processed. For example, image data represents one modality while sound data represents another. In addition to describing data types that conform to one or more human sensory modalities, the term is also intended to encompass data types and formats that may have little or no relation to the human senses. For example, financial, demographic, and literary data also represent modalities within the definition of the term as used herein.

As used herein, the term "(data) submodality" refers to a sub-classification of a data modality. In some embodiments, a submodality refers to one of the applications or sources for the data that can affect how the data is processed. For example, X-ray and satellite photography are submodalities of the imaging modality. Systems that are manufactured by different vendors (e.g., GENERAL ELECTRIC, SIEMENS) but are used for producing X-ray images can vary enough in data formatting to require separation into different submodalities.

FIG. 1 shows an example system 100 for executing an anomaly detection system. In one embodiment, the system 100 includes a single computer 101. In an alternate embodiment, the system 100 includes a computer 101 in communication with pluralities of other computers 103. In an alternate embodiment, the computer 101 is connected with pluralities of other computers 103, a server 104, a datastore 106, and/or a network 108, such as an intranet or the Internet. In yet another embodiment, a bank of servers, a wireless device, a cellular telephone, and/or another data capture/entry device(s) can be used in place of the computer 101. In one embodiment, a data storage device 106 stores an anomaly detection datastore. The datastore 106 can be stored locally at the computer 101 or at any remote location while remaining retrievable by the computer 101. In one embodiment, an application program, which creates the datastore 106, is run by the server 104 or by the computer 101. Also, the computer 101 or server 104 can include an application program(s) that identifies an anomaly in one or between or among pluralities of digital data streams. In one embodiment, the media is one or pluralities of image data.

Figure 2:
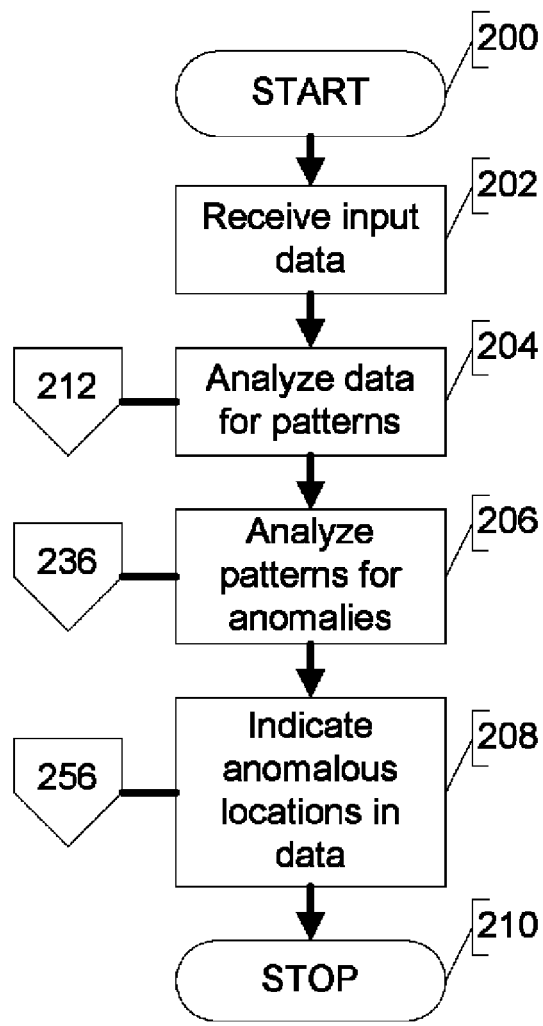
FIG. 2 shows an example method for anomaly detection via pattern-based improbability.

FIG. 2 shows an example method for anomaly detection via improbability. The method initializes at block 200, and at block 202 the input data is received. At block 204, the data is analyzed for patterns; this is described in more detail with reference to FIG. 3. At block 206, the patterns are analyzed for anomalies; this is described in more detail with reference to FIG. 4. At block 208, the anomalous locations in the data are indicated; this is described in more detail with reference to FIG. 5. At block 210, the method is complete.

Figure 3:
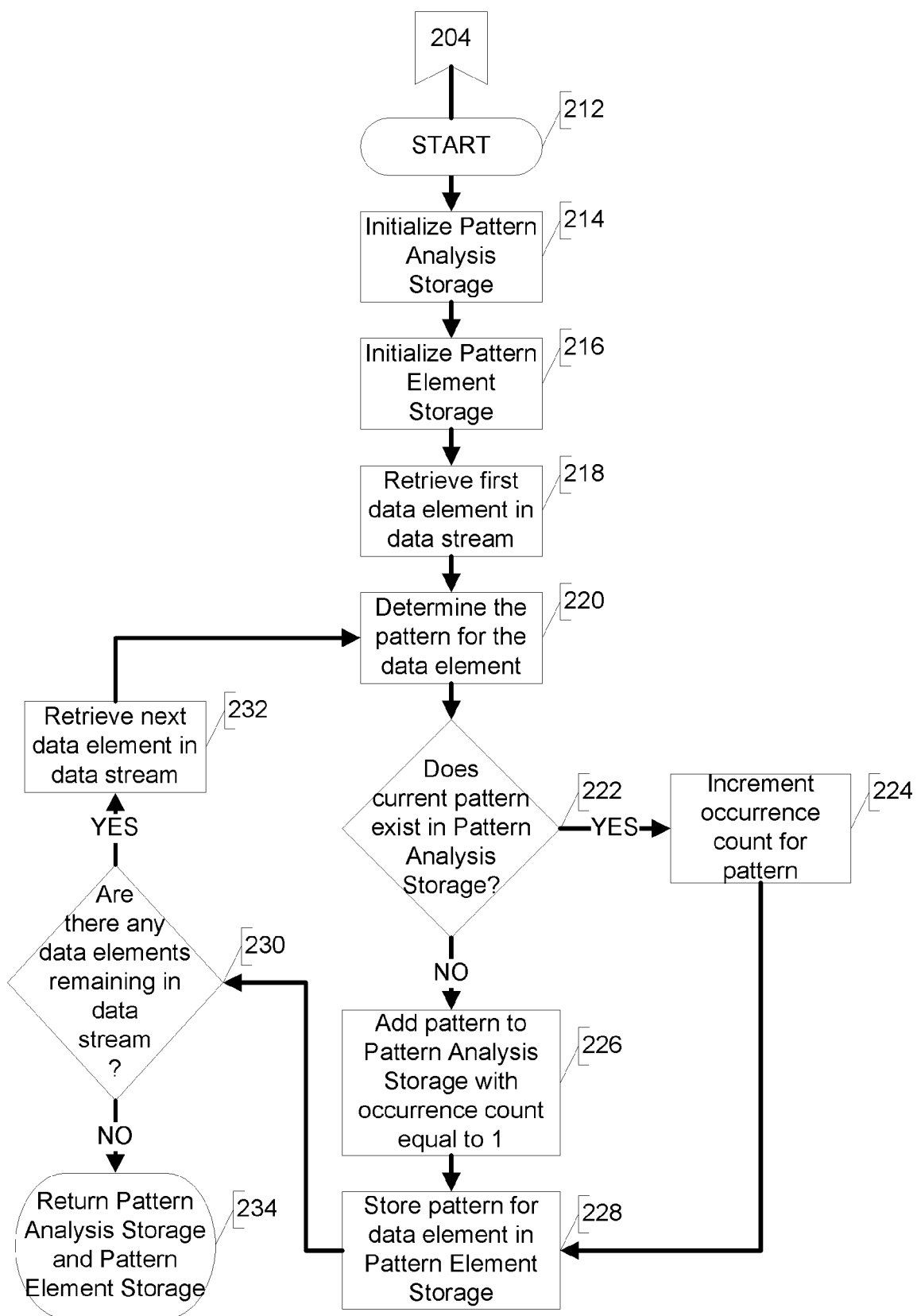
FIG. 3 shows an example method for analyzing the input data for patterns.

FIG. 3 shows an example method 204 for analyzing the input data for patterns. The method 204 initializes at block 212, and at block 214 Pattern Analysis Storage is initialized. In one embodiment, Pattern Analysis Storage is a storage structure that functions to store patterns (i.e., synaptic paths, vectors) and is similar to a synaptic web, such as disclosed by Brinson, et al., in U.S. patent application 2007/0244844 (which is incorporated by reference), while in an alternate embodiment, Pattern Analysis Storage exists as any user-specified, preset, or automatically determined storage structure capable of storing patterns and associated information about each pattern. In one embodiment, Pattern Analysis Storage is new for each data stream to be analyzed, while in an alternate embodiment Pattern Analysis Storage results from the processing of previous data streams containing examples of no anomalous data.

At block 216 of FIG. 3, Pattern Element Storage is initialized. In one embodiment, Pattern Element Storage is a multidimensional array that functions to store a reference to the pattern for the data element (as sourced from the Pattern Analysis Storage) and is addressed in the same manner as the data elements of the original data stream. At block 218, the first data element within the current data stream is retrieved. At block 220, the pattern for the data element is determined. In one embodiment, the data elements are assigned to a target data area (TDA), and then the evaluation algorithms are used to analyze the TDA to yield algorithm values. In an alternate embodiment, the pattern is determined using any acceptable user-specified, preset, or automatically determined methodology for pattern determination. At block 222, a decision is made as to whether the current pattern exists within Pattern Analysis Storage. If YES at block 222, at block 224 the occurrence count for the current pattern is incremented, and the method 204 proceeds to block 228. If NO at block 222, at block 226 the current pattern is added to the Pattern Analysis Storage with an occurrence count of one, and the method 204 proceeds to block 228.

At block 228 of FIG. 3, the current pattern for the current data element is stored within the Pattern Element Storage. At block 230, a decision is made as to whether there are any remaining data elements within the current data stream. If YES at block 230, at block 232 the next data element in the data stream is retrieved, and the method 204 returns to block 220. If NO at block 230, at block 234, Pattern Analysis Storage and Pattern Element Storage are returned, and the method 204 is complete.

Figure 4:
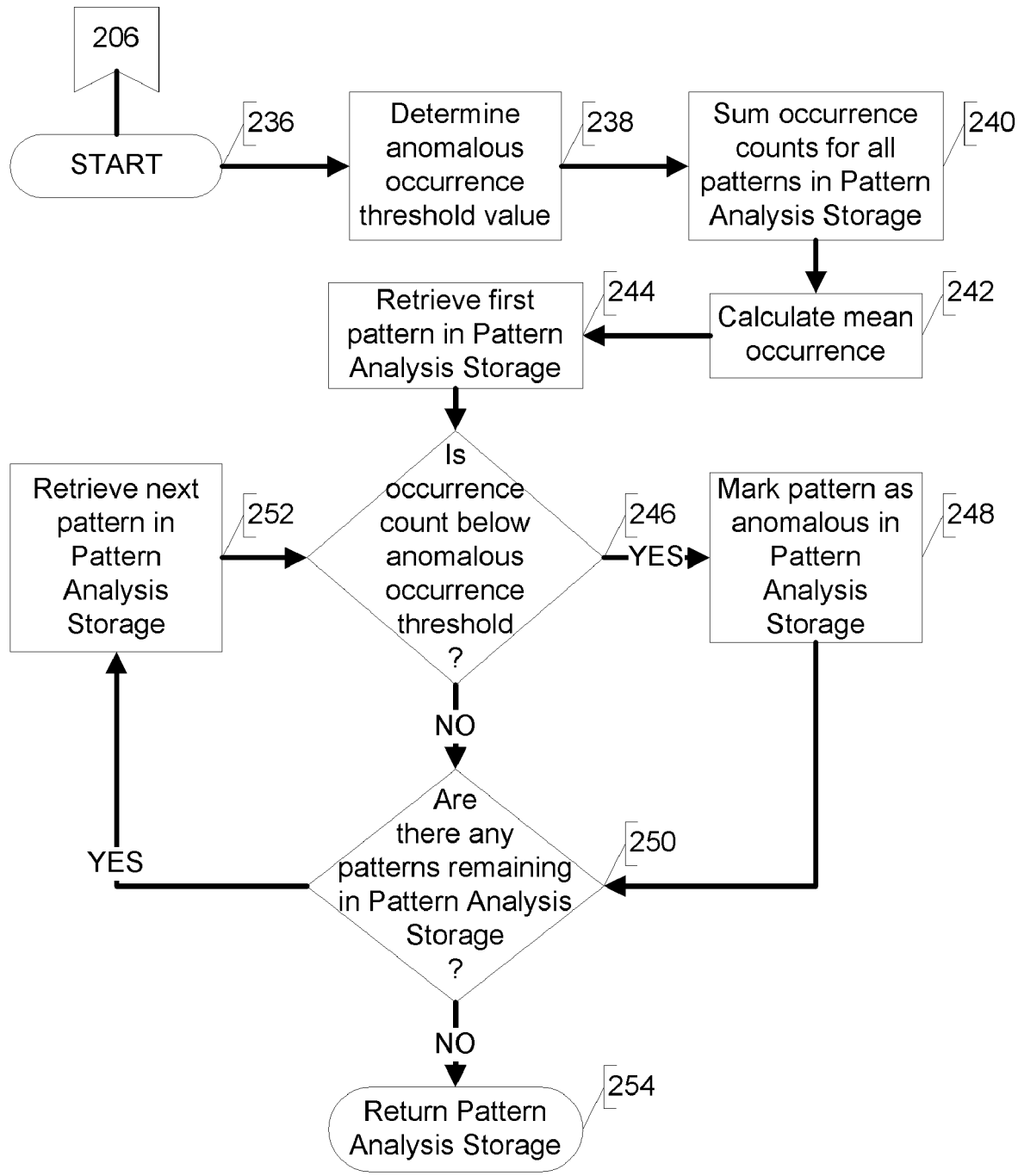
FIG. 4 shows an example method for analyzing the patterns for the presence of anomalies.

FIG. 4 shows an example method 206 for analyzing the patterns for anomalies. The method 206 initializes at block 236, and at block 238 the anomalous occurrence threshold value, which is calculated as a user-specified, preset, or automatically determined percentage of the mean occurrence count, is determined. In one embodiment, this percentage is determined using this process in a prior analysis of exemplar data streams containing similar anomalies. At block 240, the occurrence counts for all patterns within Pattern Analysis Storage are summed. At block 242, the mean occurrence value is calculated. At block 244, the first pattern within the Pattern Analysis Storage is retrieved. At block 246, a decision is made as to whether the occurrence count for the current pattern is below the anomalous occurrence threshold value. If YES at block 246, at block 248 the pattern is marked as anomalous within the Pattern Analysis Storage, and the method 206 proceeds to block 250. If NO at block 246, at block 250 a decision is made as to whether there are any more patterns remaining within Pattern Analysis Storage. If YES at block 250, at block 252 the next pattern within Pattern Analysis Storage is retrieved, and the method 206 returns to block 246. If NO at block 250, at block 254 Pattern Analysis Storage is returned, and the method 206 is complete.

Figure 5:
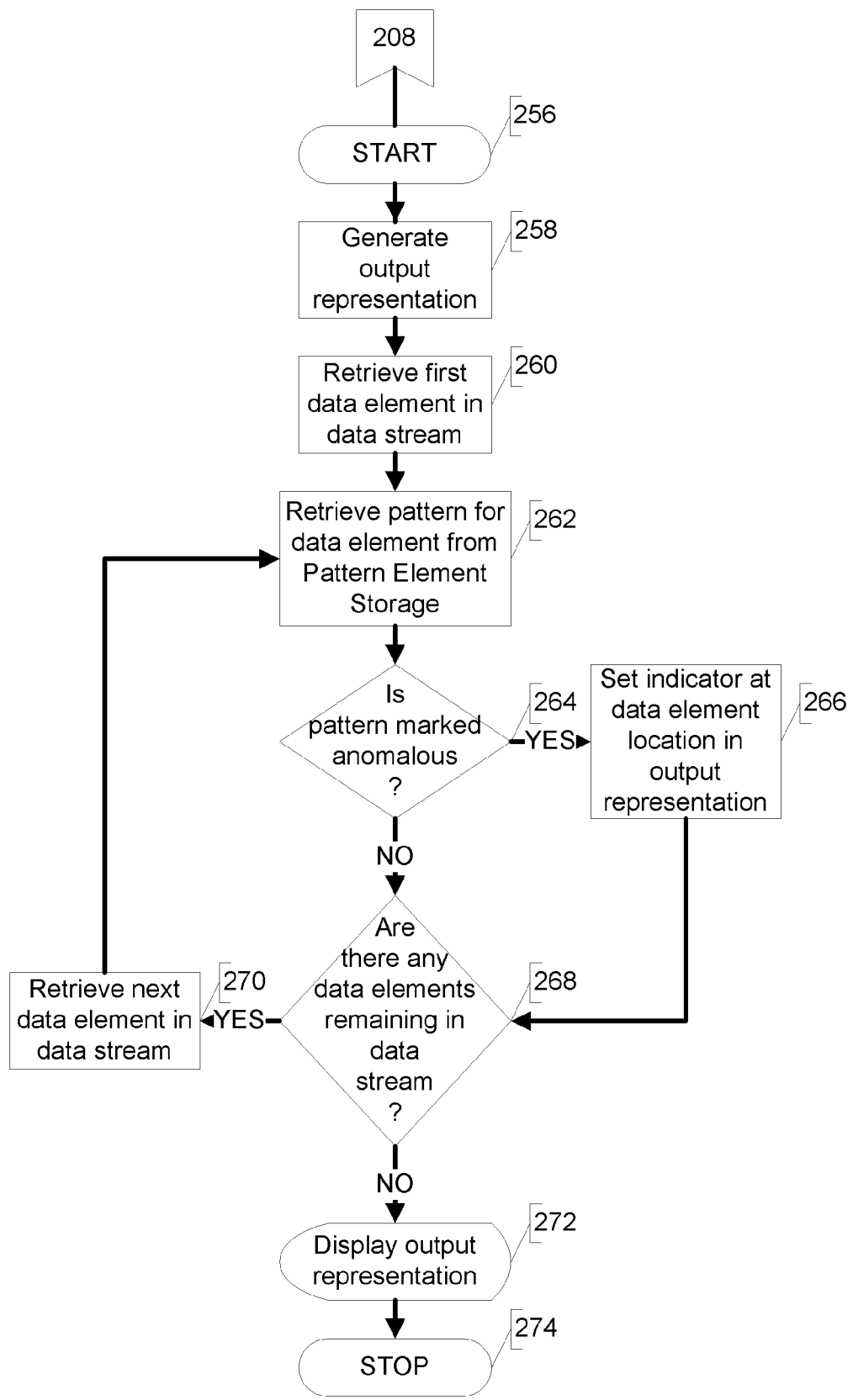
FIG. 5 shows an example method for indicating the anomalous locations within the current data stream(s)

FIG. 5 shows an example method 208 for indicating the anomalous locations within the current data stream. The method 208 initializes at block 256, and at block 258 the output representation, which in any embodiment is similar to the representation input data stream in that it is similarly sized and is addressed in the same manner, is generated. At block 260, the first data element in the data stream is retrieved. At block 262, the pattern associated with the current data element is retrieved from Pattern Element Storage. At block 264, a decision is made as to whether the pattern is marked anomalous (i.e., the occurrence count is less than some threshold). If YES at block 264, at block 266 the indicator at the data element location in the output representation is set, and the method 208 proceeds to block 268. If NO at block 264, at block 268 a decision is made as to whether there are any more data elements remaining in the data stream. If YES at block 268, at block 270 the next data element in the data stream is retrieved, and the method 208 returns to block 262. If NO at block 268, at block 272 the output representation is displayed. At block 274, the method 208 is complete.

For illustrative purposes, the anomaly detection methods and systems as disclosed herein are exemplified with reference to the imagery examples as shown in FIGS. 6-27.

As described previously, the system of the present invention first requires subject data to be algorithmically evaluated using any acceptable user-specified, preset, and/or automatically determined data analysis system. For the purposes of these examples, the original data is first analyzed utilizing the data analysis system as disclosed by Brinson, et al., in U.S. patent application 2007/0244844; however, any acceptable methodology and/or system can be used. It is important to note that the methods and systems as disclosed herein are not limited to applicability in the imagery data type alone, however. Said methods and systems can be used to evaluate data and detect anomalies in any data set(s) or other collections of information that can be represented in quantifiable datastores.

FIG. 6 is an example data array representing a two-dimensional, grey-scale, ten-data element (i.e., pixel) by ten-data element image selection of a white (i.e., data element value 255) boat on black (i.e., data element value 0) water with a grey (i.e., data element value 128) sky (hereafter "original data"). The X-location coordinate for each data element of the data array is indicated by the corresponding label in the column header, and the Y-location coordinate for each data element is indicated by the corresponding label in the row header. This image selection has a total of 100 data elements. In this instance, the numbers shown within the data array are the grey-scale pixel values of the original image selection, while in an alternate instance the numbers represent some other quantifiable characteristic (e.g., location reference, brightness, resolution, elevation) of the data elements. Ultimately, the data element values depicted in the data array of FIG. 6 are captured and analyzed during data analysis using pre-selected evaluation algorithms and a pre-determined TDA.

Figure 7:
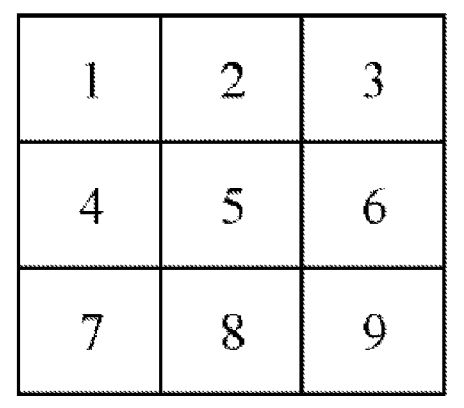

FIG. 7 shows the adjacent-data element TDA, which exists as a localized grouping of eight adjacent data elements surrounding a single, centralized TDE (hereafter "adjacent-data element TDA"). In this example, the adjacent-data element TDA is to be used for algorithmic analysis of the original data. In other instances, however, the adjacent-data element TDA does not necessarily represent the preferred TDA embodiment in all data types, modalities, submodalities, etc. As shown in the data array of FIG. 6, the first and last rows and columns of data element values in the data array are highlighted because the data elements contained therein do not abut the requisite adjacent data elements as required for complete analysis in accordance with the adjacent-data element TDA; as such, these data elements are not considered "valid" during processing.

In this example, the TDA evaluation algorithms to be used to accomplish data analysis prior to anomaly detection are selected to be the mean algorithm (hereafter "ALG1"), as defined by EQUATION 1; the spread of values algorithm (hereafter "ALG2"), as defined by EQUATION 2; and the value count algorithm (hereafter "ALG3"), which is a count of each unique data element value comprising the TDA for a given TDE.

$$\bar{x} = \frac{\sum_{i=1}^{x} x_i}{n} \quad \text{EQUATION 1}$$

Where $\bar{x}$ is the mean value;
$x_i$ is the TDA-member data element value;
and n is the data element sample size (i.e., the number of member-data elements that are to be evaluated in the TDA for a given TDE).

$$S = x_{i_{max}\square} - x_{i_{min}\square} \quad \text{EQUATION 2}$$

Where S is the value spread;
$x_{i_{max}\square}$ is the maximum TDA member-data element value;
and $x_{i_{min}\square}$ is the minimum TDA member-data element value.

In another instance, spatial iteration algorithms can be used. In another instance, selection of the TDA to be used during data analysis automatically determines which evaluation algorithms are used; or vice versa, selection of the evaluation algorithms automatically determines the TDA. In yet another instance, selection of a given TDA or selection of a given evaluation algorithm determines all subsequent evaluation algorithms to be used throughout data analysis.

In one embodiment, algorithmic processing of the original data of FIG. 6 begins at any valid, user-specified, preset, or automatically determined data element. In one instance, processing with ALG1 using the adjacent-data element TDA initializes at TDE (2, 2) and returns a value of 128 per the following calculations.

1. Sum the member-data element values of the adjacent-data element TDA for TDE (2, 2). In this instance, include the TDE value in the calculations.

$$\sum_{i=1}^{n} x_i = (128 + 128 + 128 + 128 + 128 + 128 + 128 + 128 + 128)$$

$$\sum_{i=1}^{n} x_i = (1,152)$$

2. Divide the sum from Step 1 by the total number of member-data elements of the adjacent-data element TDA for TDE (2, 2). Include the TDE in the count.

$$\bar{x} = \frac{1,152}{9}$$

$$\bar{x} = 128$$

In one embodiment, the resultant value 128 is stored in any user-specified, preset, or automatically determined storage structure, which is sized and addressed in the same manner as the original data, at the corresponding TDE location (i.e., TDE location (2, 2)). In an alternate embodiment, the resultant value 128 is stored in a temporary storage device.

In one instance, TDE (2, 2) of the FIG. 6 original data is then processed with ALG2 using the adjacent-data element TDA. A value of 0 is returned per the following calculations.

1. Determine the highest member-data element value of the adjacent-data element TDA for TDE (2, 2).

$$x_{i_{max}\square} = 128$$

2. Determine the lowest member-data element value of the adjacent-data element TDA for TDE (2, 2).

$$x_{i_{min}\square} = 128$$

3. Calculate the spread of values by subtracting the lowest member-data element value, as determined in Step 2, from the highest member-data element value, as determined in Step 1.

$$S = x_{i_{max}\square} - x_{i_{min}\square}$$

$$S = 128 - 128$$

$$S = 0$$

In one embodiment, the resultant value 0 is stored in the aforementioned storage structure at the corresponding TDE location (i.e., TDE location (2, 2)).

In one instance, TDE (2, 2) of the FIG. 6 original data is then processed with ALG3 using the adjacent-data element TDA. A value of 1 is returned per the following calculations.

1. Make a list of all the unique data element values present within the adjacent-data element TDA corresponding to TDE (2, 2).
   128
2. Count each of the unique data element values present in the list of Step 1.
   Count=1

In one embodiment, the resultant value 1 is stored in the aforementioned storage structure at the corresponding TDE location (i.e., TDE location (2, 2)).

Following the processing of TDE (2, 2) of the FIG. 6 original data with ALG1, ALG2, and ALG3 using the adjacent-data element TDA, processing proceeds to the next valid TDE and then continues until the collection of valid TDEs in the image selection is exhausted. In an alternate embodiment, all valid TDEs are processed with a single evaluation algorithm using the adjacent-data element TDA prior to initialization of processing with any subsequent evaluation algorithms.

FIG. 8 shows an example data table for one embodiment of the data storage structure or cache, which is initialized as an organizational structure to store the algorithm values resulting from processing each valid TDE of the FIG. 6 original data with ALG1, ALG2, and ALG3 using the adjacent-data element TDA. This storage structure is indexed by TDE location for reference purposes.

Once data analysis is complete and the algorithm values associated with each valid TDE of the FIG. 6 original data are identified, the methods and systems for anomaly detection are initialized. In this example, the data patterns for each data element (i.e., valid TDE of the original data) are generated via concatenation of each of the algorithmic processing results achieved from evaluation of a given valid TDE with ALG1, ALG2, and ALG3 using the adjacent-data element TDA. For example and with reference to TDE (2, 2) from FIG. 6, the data value pattern is determined to be (128, 0, 1). FIG. 9 shows an example data table representing Pattern Element Storage containing the data value patterns (or vectors), which in one embodiment are the same as synaptic paths as disclosed by Brinson, et al. in U.S. patent application 2007/0244844, associated with each valid TDE of the original data. In this instance, the FIG. 9 data table is indexed by TDE location for reference purposes.

FIG. 10 shows an example data table representing Pattern Analysis Storage wherein each unique data pattern or vector associated with the valid TDEs of the FIG. 6 data array are listed with an associated occurrence count. For this example, Pattern (0, 0, 1) is associated with nineteen different TDEs of the original data, while Pattern (85, 255, 2) is associated with one TDE.

Once the occurrence counts for all the patterns of Pattern Analysis Storage are established, the anomalous occurrence threshold value is user-specified, preset, or automatically determined. In this instance, the threshold value is set to 100% due to the small data set. However, in an alternate instance, the threshold value is determined based upon a percentage (or ranges of percentages) set by the user or calculated via prior analyses. Next, the mean occurrence count value is determined per the following calculations.

1. Sum the occurrence counts for all the patterns of Pattern Analysis Storage.

$$\sum_{i=1}^{n} x_i = (19 + 9 + 4 + 4 + 4 + 2 + 2 + 2 + 2 + 2 + 2 +$$
$$2 + 2 + 2 + 1 + 1 + 1 + 1 + 1 + 1)$$
$$\sum_{i=1}^{n} x_i = (64)$$

2. Divide the sum from Step 1 by the total number of patterns.

$$\bar{x} = \frac{64}{20}$$
$$\bar{x} = 3.2$$

For this example, the anomalous occurrence threshold value, which is set to 100%, indicates that all the data patterns of Pattern Analysis Storage with an occurrence count below the mean occurrence count of 3.2 are considered anomalous. FIG. 11 shows an example data array, which is sized and addressed in the same manner as the original data, representing one embodiment of an output representation of the anomalous data elements, which are shown painted black.

While the example depicted in FIGS. 6-11 illustrates a simple instance of anomaly detection within a single frame image, FIGS. 12-27 expound upon the anomaly detection capabilities of the present invention by showing that through improved data analysis prior to anomaly detection, the incidences of false positive identifications in a single frame analysis can be significantly reduced.

FIG. 12 is an example data array representing a two-dimensional, grey-scale, ten-data element by ten-data element image selection of a low horizon with black water below and grey sky above. As previously described and as utilized throughout this example, the TDA evaluation algorithms to be used to accomplish data analysis prior to anomaly detection are selected to be ALG1, ALG2, and ALG3. Moreover, in one embodiment algorithmic processing begins at any valid, user-specified, preset, or automatically determined data element. In one instance, processing with ALG1 followed by ALG2 and then by ALG3 using the adjacent-data element TDA initializes at TDE (2, 2) and returns values of 128, 0, and 1, respectively. The associated calculations are previously explained. In one embodiment, the resultant values are stored in any user-specified, preset, or automatically determined storage structure, which is sized and addressed in the same manner as the data of FIG. 12, at the corresponding TDE location (i.e., TDE location (2, 2)). In an alternate embodiment, the resultant values are stored in a temporary storage device.

Following the processing of TDE (2, 2) of the data of FIG. 12 with ALG1, ALG2, and ALG3 using the adjacent-data element TDA, processing proceeds to the next valid TDE and then continues until the collection of valid TDEs in the image selection is exhausted. In an alternate embodiment, all valid TDEs are processed with a single evaluation algorithm using the pre-determined TDA prior to initialization of processing with any subsequent evaluation algorithms.

FIG. 13 shows an example data table for one embodiment of the data storage structure or cache, which is initialized as an organizational structure to store the algorithm values resulting from processing each valid TDE of the FIG. 12 data array with ALG1, ALG2, and ALG3 using the adjacent-data element TDA. This storage structure is indexed by TDE location for reference purposes. Also depicted in FIG. 13 are the concatenated data patterns associated with each data element (i.e., valid TDE) of the FIG. 12 data array; this column of data (labeled "Pattern") represents Pattern Element Storage.

FIG. 14 shows an example data table representing Pattern Analysis Storage wherein each unique data pattern associated with the valid TDEs of the FIG. 12 data array are listed with an associated occurrence count. Once the occurrence counts for all the patterns of Pattern Analysis Storage are established, the anomalous occurrence threshold value is user-specified, preset, or automatically determined. In this instance, the threshold value is set to 25%. Next, the mean occurrence count value is determined per the following calculations.

$$\sum_{i=1}^{n} x_i = (8 + 32 + 4 + 4 + 4 + 4 + 4 + 4) \qquad 1$$

$$\sum_{i=1}^{n} x_i = (64). $$

$$\bar{x} = \frac{64}{8} \qquad 2$$

$$\bar{x} = 8.$$

For this example, the anomalous occurrence threshold value, which is set to 25%, indicates that those data patterns of Pattern Analysis Storage with an occurrence count below 25% of the mean occurrence count of 8 are considered anomalous; otherwise stated, those patterns with occurrence counts of 2 or less are anomalous. FIG. 15 shows an example data array, which is sized and addressed in the same manner as the FIG. 12 data array, representing one embodiment of an output representation of the anomalous data elements, which are non-existent in this example.

Continuing with the same example, FIG. 16 is an example data array representing a two-dimensional, grey-scale, ten-data element by ten-data element image selection of a medium horizon with water below and sky above. As previously described, the TDA evaluation algorithms to be used to accomplish data analysis prior to anomaly detection are selected to be ALG1, ALG2, and ALG3. Moreover, in one embodiment, algorithmic processing begins at any valid, user-specified, preset, or automatically determined data element. In one instance, processing with ALG1 followed by ALG2 and then by ALG3 using the adjacent-data element TDA initializes at TDE (2, 2) and returns values of 128, 0, and 1, respectively. The associated calculations are previously explained. In one embodiment, the resultant values are stored in any user-specified, preset, or automatically determined storage structure, which is sized and addressed in the same manner as the data of FIG. 16, at the corresponding TDE location (i.e., TDE location (2, 2)). In an alternate embodiment, the resultant values are stored in a temporary storage device.

Following the processing of TDE (2, 2) of the FIG. 16 data array with ALG1, ALG2, and ALG3 using the adjacent-data element TDA, processing proceeds to the next valid TDE and then continues until the collection of valid TDEs in the image selection is exhausted. In an alternate embodiment, all valid TDEs are processed with a single evaluation algorithm using the pre-determined TDA prior to initialization of processing with any subsequent evaluation algorithms.

FIG. 17 shows an example data table for one embodiment of the data storage structure or cache, which is initialized as an organizational structure to store the algorithm values resulting from processing each valid TDE of the FIG. 16 data array with ALG1, ALG2, and ALG3 using the adjacent-data element TDA; the storage structure is indexed by TDE location for reference purposes. Also depicted in FIG. 17 are the concatenated data patterns associated with each data element (i.e., valid TDE) of the FIG. 16 data array; this column of data (labeled "Pattern") represents Pattern Element Storage.

FIG. 18 shows an example data table representing Pattern Analysis Storage wherein each unique data pattern associated with the valid TDEs of the FIG. 16 data array are listed with an associated occurrence count. Also shown are the data pattern occurrence counts associated with the prior data analysis round involving the FIG. 12 data array as well as summed occurrence counts for each data pattern. Once the occurrence counts for all the patterns of Pattern Analysis Storage are established, the anomalous occurrence threshold value is user-specified, preset, or automatically determined. In this instance, the threshold value is set to 25%. Next, the mean value of the total occurrence count values is determined per the following calculations.

$$\sum_{i=1}^{n} x_i = (32 + 48 + 8 + 8 + 8 + 8 + 8 + 8) \quad 1$$

$$\sum_{i=1}^{n} x_i = (128).$$

$$\bar{x} = \frac{128}{8} \quad 2$$

$$\bar{x} = 16.$$

For this example, the anomalous occurrence threshold value, which is set to 25%, indicates that those data patterns of Pattern Analysis Storage with an occurrence count below 25% of the mean occurrence count of 16 are considered anomalous; otherwise stated, those patterns with occurrence counts of 4 or less are anomalous. FIG. 19 shows an example data array, which is sized and addressed in the same manner as the FIG. 16 data array, representing one embodiment of an output representation of the anomalous data elements, which are non-existent in this case.

Continuing with the same example, FIG. 20 is an example data array representing a two-dimensional, grey-scale, ten-data element by ten-data element image selection of a high horizon with water below and sky above. As previously described, the TDA evaluation algorithms to be used to accomplish data analysis prior to anomaly detection are selected to be ALG1, ALG2, and ALG3. Moreover, in one embodiment algorithmic processing begins at any valid, user-specified, preset, or automatically determined data element.

In one instance, processing with ALG1 followed by ALG2 and then by ALG3 using the adjacent-data element TDA initializes at TDE (2, 2) and returns values of 100, 128, and 2, respectively. The associated calculations are previously explained. In one embodiment, the resultant values are stored in any user-specified, preset, or automatically determined storage structure, which is sized and addressed in the same manner as the data of FIG. 20, at the corresponding TDE location (i.e., TDE location (2, 2)). In an alternate embodiment, the resultant values are stored in a temporary storage device.

Following the processing of TDE (2, 2) of the FIG. 20 data array with ALG1, ALG2, and ALG3 using the adjacent-data element TDA, processing proceeds to the next valid TDE and then continues until the collection of valid TDEs in the image selection is exhausted. In an alternate embodiment, all valid TDEs are processed with a single evaluation algorithm using the pre-determined TDA prior to initialization of processing with any subsequent evaluation algorithms.

FIG. 21 shows an example data table for one embodiment of the data storage structure or cache, which is initialized as an organizational structure to store the algorithm values resulting from processing each valid TDE of the FIG. 20 data array with ALG1, ALG2, and ALG3 using the adjacent-data element TDA; the storage structure is indexed by TDE location for reference purposes. Also depicted in FIG. 21 are the concatenated data patterns associated with each data element (i.e., valid TDE) of the FIG. 20 data array; this column of data (labeled "Pattern") represents Pattern Element Storage.

FIG. 22 shows an example data table representing Pattern Analysis Storage wherein each unique data pattern associated with the valid TDEs of the FIG. 20 data array are listed with an associated occurrence count. Also shown are the data pattern occurrence counts associated with the prior data analysis rounds involving the FIG. 12 and FIG. 16 data arrays as well as summed occurrence counts for each data pattern. Once the occurrence counts for all the patterns of Pattern Analysis Storage are established, the anomalous occurrence threshold value is user-specified, preset, or automatically determined. In this instance, the threshold value is set to 25%. Next, the mean value of the total occurrence count values is determined per the following calculations.

$$\sum_{i=1}^{n} x_i = (72 + 48 + 12 + 12 + 12 + 12 + 12 + 12) \quad 1$$

$$\sum_{i=1}^{n} x_i = (192).$$

$$\bar{x} = \frac{192}{8} \quad 2$$

$$\bar{x} = 24.$$

For this example, the anomalous occurrence threshold value, which is set to 25%, indicates that those data patterns of Pattern Analysis Storage with an occurrence count below 25% of the mean occurrence count of 24 are considered anomalous; otherwise stated, those patterns with occurrence counts of 6 or less are anomalous. FIG. 23 shows an example data array, which is sized and addressed in the same manner as the FIG. 20 data array, representing one embodiment of an output representation of the anomalous data elements, which are non-existent in this case.

To conclude this example, FIG. 24 is an example data array representing a two-dimensional, grey-scale, ten-data element by ten-data element image selection of a high horizon with water below and sky above. As previously described, the TDA evaluation algorithms to be used to accomplish data analysis prior to anomaly detection are selected to be ALG1, ALG2, and ALG3. Moreover, in one embodiment, algorithmic processing begins at any valid, user-specified, preset, or automatically determined data element. In one instance, processing with ALG1 followed by ALG2 and then by ALG3 using the adjacent-data element TDA initializes at TDE (2, 2) and returns values of 128, 0, and 1, respectively. The associated calculations are previously explained. In one embodiment, the resultant values are stored in any user-specified, preset, or automatically determined storage structure, which is sized and addressed in the same manner as the data of FIG. 24, at the corresponding TDE location (i.e., TDE location (2, 2)). In an alternate embodiment, the resultant values are stored in a temporary storage device.

Following the processing of TDE (2, 2) of the FIG. 24 data array with ALG1, ALG2, and ALG3 using the adjacent-data element TDA, processing proceeds to the next valid TDE and then continues until the collection of valid TDEs in the image selection is exhausted. In an alternate embodiment, all valid TDEs are processed with a single evaluation algorithm using the pre-determined TDA prior to initialization of processing with any subsequent evaluation algorithms.

FIG. 25 shows an example data table for one embodiment of the data storage structure or cache, which is initialized as an organizational structure to store the algorithm values resulting from processing each valid TDE of the FIG. 24 data array with ALG1, ALG2, and ALG3 using the adjacent-data element TDA; the storage structure is indexed by TDE location for reference purposes. Also depicted in FIG. 25 are the concatenated data patterns associated with each data element (i.e., valid TDE) of the FIG. 24 data array; this column of data (labeled "Pattern") represents Pattern Element Storage.

FIG. 26 shows an example data table representing Pattern Analysis Storage wherein each unique data pattern associated with the valid TDEs of the FIG. 24 data array are listed with an associated occurrence count. Also shown are the data pattern occurrence counts associated with the prior data analysis rounds involving the FIG. 12, FIG. 16, and FIG. 20 data arrays as well as summed occurrence counts for each data pattern. Once the occurrence counts for all the patterns of Pattern Analysis Storage are established, the anomalous occurrence threshold value is user-specified, preset, or automatically determined. In this instance, the threshold value is set to 25%. Next, the mean value of the current occurrence count values is determined per the following calculations.

$$\sum_{i=1}^{n} x_i = (21 + 11 + 3 + 3 + 4 + 2 + 3 + 1 + 1 + 3 + 2 + 2 + $$
$$1 + 1 + 3 + 3 + 0 + 0 + 0 + 0 + 0 + 0) \qquad 1$$

$$\sum_{i=1}^{n} x_i - (64).$$

$$\bar{x} = \frac{64}{22} \qquad 2$$

$$\bar{x} = 2.9091 \cong 3.$$

For this example, the anomalous occurrence threshold value, which is set to 25%, indicates that those data patterns of Pattern Analysis Storage with an occurrence count below 25% of the mean occurrence count of 3 are considered anomalous; otherwise stated, those patterns with occurrence counts of approximately 1 or less are anomalous. FIG. 27 shows an example data array, which is sized and addressed in the same manner as the FIG. 24 data array, representing one embodiment of an output representation of the anomalous data elements, which are shown painted black.

While the preferred embodiment of the present invention has been illustrated and described, as noted above, many changes can be made without departing from the spirit and scope of the invention. Accordingly, the scope of the invention is not limited by the disclosure of the preferred embodiment.

The embodiments of the invention in which an exclusive property or privilege is claimed are defined as follows:

1. A method performed by a computer system, the method comprising:
   determining if an anomaly occurs in a data stream, by:
   a. receiving a data element included in the first data stream;
   b. determining a pattern for the received data element;
   c. incrementing an occurrence count for a pattern stored in a pattern analysis storage, if the determined pattern for the received data element matches the stored pattern;
   d. repeating a-c for other data elements in the first data stream;
   e. determining a mean occurrence count value based on the sum of the occurrence counts of all of the patterns stored in the pattern analysis storage divided by the total number of patterns stored in the pattern analysis storage;
   f. retrieving an occurrence count for a first stored pattern in the pattern analysis storage;
   g. identifying the pattern as an anomaly, if the retrieved occurrence count is below the determined mean occurrence count value multiplied by a percentage threshold value;
   h. repeating f and g for other patterns stored in the pattern analysis storage; and
   i. outputting an anomaly identifier if the pattern was identified as an anomaly.

2. The method of claim 1, wherein determining a pattern for the received data element comprises applying one or more algorithms to the data element.

3. The method of claim 1, wherein the percentage threshold value is determined based on prior analyses.

4. The method of claim 1, wherein the percentage threshold value is a user-specified percentage.

5. The method of claim 1, wherein a-c are repeated for all the data elements in the data stream.

6. The method of claim 1, wherein f and g are repeated for all the patterns stored in the pattern analysis storage.

7. a computer system comprising:
   memory;
   a processor in data communication with the memory, the processor configured to determine if an anomaly occurs in a first data stream without reference to a prior analysis of exemplar data streams, by:
   a. receiving a data element included in a first data stream;
   b. determining a pattern for the received data element;
   c. incrementing an occurrence count for a pattern stored in a pattern analysis storage in the memory, if the determined pattern for the received data element matches the stored pattern;
   d. repeating a-c for other data elements in the first data stream;
   e. determining an occurrence count value based on the sum of the occurrence counts of all of the patterns stored in the pattern analysis storage divided by the total number of patterns stored in the pattern analysis storage;
   f. retrieving an occurrence count for a first stored pattern in the pattern analysis storage;
   g. identifying the pattern as an anomaly, if the retrieved occurrence count is below the determined occurrence count value multiplied by a percentage threshold value;

h. repeating f and g for other patterns stored in the pattern analysis storage; and i. for each of the data elements in the first data stream, indicating that the data element is anomalous if its associated pattern in the pattern analysis storage is identified as anomalous; and an output device configured to output an anomaly identifier if the pattern was identified as an anomaly.

8. The system of claim 7, wherein the processor determines a pattern for the received data element by applying one or more algorithms to the data element.

9. The system of claim 7, wherein the threshold is a predefined percentage of a mean of the occurrence count of all the patterns.

10. The system of claim 7, wherein a-c are repeated for all the data elements in the first data stream.

11. The system of claim 7, wherein e and f are repeated for all the patterns stored in the pattern analysis storage.

12. A computer system comprising:

a computer configured to determine if an anomaly occurs in a first data stream without reference to a prior analysis of exemplar data streams, the computer including:

a. a means for receiving a data element included in the first data stream;

b. a means for determining a pattern for the received data element;

c. a means for incrementing an occurrence count for a pattern stored in a pattern analysis storage, if the determined pattern for the received data element matches the stored pattern;

d. a means for repeating a-c for other data elements in the first data stream;

e. a means for determining a mean occurrence count value based on the sum of the occurrence counts of all of the patterns stored in the pattern analysis storage over the total number of patterns stored in the pattern analysis storage;

f. a means for retrieving an occurrence count for a first stored pattern in the pattern analysis storage;

g. a means for identifying the pattern as an anomaly, if the retrieved occurrence count is below the determined mean occurrence count value multiplied by a percentage threshold value;

h. a means for repeating f and g for other patterns stored in the pattern analysis storage;

i. a means for outputting an anomaly identifier if the pattern was identified as an anomaly; and j. a means for indicating, for each of the data elements in the first data stream, that the data element is anomalous if its associated pattern in the pattern analysis storage is identified as anomalous.

13. The system of claim 12, wherein the means for determining a pattern for the received data element, determines a pattern by applying one or more algorithms to the data element.

14. The system of claim 12, wherein a-c are repeated for all the data elements in the first data stream and wherein e and f are repeated for all the patterns stored in the pattern analysis storage.

15. The method of claim 1, wherein the determining if the anomaly occurs in the first data stream includes determining if the anomaly occurs in the first data stream without reference to a prior analysis of exemplar data streams.

16. The method of claim 1, wherein the determining if the anomaly occurs in the data stream includes determining if the anomaly occurs in the first data stream without a priori knowledge of normal conditions obtained from exemplar data streams.

17. The method of claim 1, further comprising:

processing a second data stream to determine occurrence counts for patterns associated with elements of the second data stream;

for each pattern in the pattern analysis storage, storing a sum of the occurrence count for the pattern determined with respect to the first data stream and the occurrence count for the pattern determined with respect to the second data stream; and determining the mean occurrence count value as equal to the sum of the stored sums for each of the patterns stored in the pattern analysis storage divided by the total number of patterns stored in the pattern analysis storage.

18. The method of claim 1, further comprising:

for each of the data elements in the first data stream, identifying an associated pattern in the pattern analysis storage; and if the identified pattern is identified as anomalous, indicating that the data element is anomalous.

19. The method of claim 1 wherein the pattern analysis storage includes a table that associates data pattern vectors with occurrence counts and that is indexed by data pattern vectors.

20. The system of claim 7, wherein identifying the pattern as an anomaly is based at least in part on standard deviations of a distribution of the occurrence counts in the pattern analysis storage.

* * * * *